(12) United States Patent
Little et al.

(10) Patent No.: US 7,047,518 B2
(45) Date of Patent: May 16, 2006

(54) SYSTEM FOR SOFTWARE APPLICATION DEVELOPMENT AND MODELING

(75) Inventors: Todd Little, Palatine, IL (US); Loren Konkus, Novi, MI (US)

(73) Assignee: BEA Systems, Inc., San Jose, CA (US)

( * ) Notice: Subject to any disclaimer, the term of this patent is extended or adjusted under 35 U.S.C. 154(b) by 672 days.

(21) Appl. No.: 09/970,917

(22) Filed: Oct. 4, 2001

(65) Prior Publication Data

US 2002/0091990 A1     Jul. 11, 2002

Related U.S. Application Data

(60) Provisional application No. 60/238,561, filed on Oct. 4, 2000, provisional application No. 60/238,559, filed on Oct. 4, 2000.

(51) Int. Cl.
*G06F 9/44* (2006.01)

(52) U.S. Cl. .............. 717/108; 717/104; 717/110
(58) Field of Classification Search ........ 717/104–109, 717/110, 124
See application file for complete search history.

(56) References Cited

U.S. PATENT DOCUMENTS

| | | | |
|---|---|---|---|
| 6,018,627 A * | 1/2000 | Iyengar et al. | 717/103 |
| 6,199,195 B1 * | 3/2001 | Goodwin et al. | 717/104 |
| 6,212,672 B1 * | 4/2001 | Keller et al. | 717/104 |
| 6,742,175 B1 * | 5/2004 | Brassard | 717/107 |

OTHER PUBLICATIONS

U.S. Appl. No. 09/970,741, filed Oct. 4, 2001, Little et al.

* cited by examiner

*Primary Examiner*—Kakali Chaki
*Assistant Examiner*—William H. Wood
(74) *Attorney, Agent, or Firm*—Fliesler Meyer LLP

(57) ABSTRACT

A system for integrated computer software application development and modeling is herein described. The integrated system includes an expert system that can be supplied as a software plug-in to assist a software developer in designing and constructing software applications using uniform modeling language (UML) object modeling. In one embodiment the plug-in works with Rational Software Corporation's Rational Rose modeling product and can be used to develop software applications for use with M3 and the Weblogic family of transaction and application server products from BEA Systems, Inc, and with other third-party software systems.

21 Claims, 24 Drawing Sheets

228

240

SYSTEM FOR SOFTWARE APPLICATION DEVELOPMENT AND MODELING

CLAIM OF PRIORITY

This application claims priority from provisional application "SYSTEM FOR SOFTWARE APPLICATION DEVELOPMENT AND MODELING," application Ser. No.60/238,561, filed Oct. 4, 2000, and "SYSTEM AND METHOD FOR COMPUTER CODE GENERATION", application Ser. No. 60/238,559, filed Oct. 4, 2000, and is related to "SYSTEM AND METHOD FOR COMPUTER CODE GENERATION", application Ser. No. 09/979,741, Inventors Todd Little, Loren Konkus, Gilles Lavalou and Timo Metsaportti, filed Oct. 4, 2001, all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise resrves all copyright rights whatsoever.

1. Field of the Invention

The invention relates generally to computer software development systems and specifkcally to a system for developing and modeling software applications.

2. Background

The increasingly important field of software development brings with it the ever more common question—who can we get to actually do the software coding? Software developers or coders are in high demand, and their skills demand premium salaries. As such the software generation or development process is a major factor to consider for any company that relies on or uses software for it's day-to-day business needs. This issue is even more relevant to those companies who support the software development process—companies such as BEA Systems, Inc, IBM Corporation, and Microsoft Corporation who develop software development products, suites and tools. In order to maximize the benefits of their products to their end customers, these companies must develop tools that allow a software developer to minimize the amount of time necessary to finish a particular software project, while at the same time maximizing the options available to the developer to create a quality product. Some tools are also particularly geared to helping junior or beginning developers, who may not be as experienced, to successfully compete against more established and skilled software architects.

Given the importance of software development to the global industry, and the demands that it should be relatively painless, easy to work with, and that it make optimal use of time and resources, it seems natural to want to develop a software generation tool or system, that automatically generates software code in accordance with some preset or preordained wishes of a developer. This allows the software architect or developer to concentrate on the "big picture", and to envisage the functioning of the software application as a whole, without undue regard to the intricacies of code development.

To this end, many tools allow the software architect to develop a model or plan of the desired software application and to use this plan as a blueprint for subsequent software development. Similar to the way in which an architect designs blueprints for a building, software architects or designers also design blueprints for their complex software applications. And just as a building architect likes to be able to test those blueprints for structural soundness, using for example a modeling or analysis system to test each aspect of the design, software architects also like to test their software blueprints for reliability, scalability, optimal use of resources, and good software design. As the complexity of a particular project increases, so too does the need for a reliable, accurate model. The software industry has developed several modeling techniques to address this need, one of which is the Unified Modeling Language (UML), a nonproprietary language defined in the Object Management Group Unified Modeling Language Specification, hereby incorporated by reference. UML provides software architects with a standardized language for specifying, constructing, visualizing and documenting the artifacts of a complex software system. The UML specification is a successor to three earlier object-oriented methods, Booch, Object Modeling Technique (OMT), and Object Oriented Software Engineering (OOSE), and includes additional expressiveness to handle more complex modeling problems, not readily handled by prior techniques.

Some of the features inherent in UML are: Formal definition of a common object analysis and design (OA&D) metamodel to represent the semantic of OA&D models, including static, behavioral, usage and architectural models, Interface Definition Language (IDL) Specifications for mechanisms for model interchange between OA&D tools, which includes a set of IDL interfaces that support dynamic construction and traversal of a user model; and, easily readable notation for representing OA&D models, most commonly a graphic syntax for consistently expressing UML semantics. As such the UML is more correctly considered a visual modeling language rather than a visual programming language. Because of its open standard and widespread industry use it serves to lower the cost of training and retooling when changing between projects ororganizations, and provides opportunity for new integration between tools, processes and domains.

UML is more correctly considered a visual modeling language rather than a visual programming language. Because of its open standard and widespread industry use it serves to lower the cost of training and retooling when changing between projects or organizations, and provides opportunity for new integration between tools, processes and domains.

UML has served as the basis for many popular software development and modeling tools. One of these tools is "Rational Rose," an object-oriented tool produced by Rational Software Corporation (hereinafter simply referred to as Rational), which was originally designed for developing embedded technical and business applications based on the Booch methodology. Rational Rose supports UML, and is Rational's primary offering in support of component-based development (CBD) at the enterprise level. Rational Rose provides the features and extensions necessary to support enterprise-level CBD and object-oriented analysis, modeling, design, and construction (OOAMDC) functionality. To allow the tool to operate with other tools in an enterprise development environment Rational Rose provides significantly enhanced support for integration with Rational's and other manufacturers development tools, such as Visual Basic and Visual Studio, both from Microsoft Corporation.

Recently, the demand has arisen to incorporate the functionality of such modeling tools into the application server development field. One such application server is "M3"

from BEA Systems, Inc., also known in several variants as "Weblogic Server" or simply "Weblogic." M3 (and Weblogic Server) are enterprise level application servers or transaction servers that allow IT organizations to develop, deploy, and manage component based applications while building upon and leveraging existing environments and applications. No other system successfully tackles the demand for an integrated application development and modeling system for application servers.

As used herein, the term M3 is used to refer to a specific embodiment of the invention. It will be evident to one skilled in the art that the invention may be equally used with other application, transaction and enterprise servers beyond M3

Some tools have attempted to combine the design aspects of a UML-based design system, with code generation functionality, to better assist the software developer in code design and generation. An example of this type of tool is the Builder range of products from BEA Systems, Inc, San Jose, Calif., that can be used to build software applications, primarily in C or C++, and primarily for the Tuxedo server product, although other types of application can be built, and in other languages.

A problem with most of these types of product are that they tend to be proprietary in nature, or are geared specifically toward code generation for a particular species of code type or server. If the developer or architect must work across platforms on a particular project they often need to learn the specific code generation techniques for those platforms. This in turn consumes development time, and adds to both the learning and maintenance time required to manage the various platform tools. The overall situation ends up being not much more useful than the situation in which no tools were used.

An important aspect of developing new software development tools and software design products is to envisage how the design process and software code generation process can be successfully incorporated so as to maximize the ability of the developer to quickly and easily build complex applications.

SUMMARY

As used herein, the term "M3" is used to refer to a specific embodiment of the invention. It will be evident to one skilled in the art that the invention may be equally used with other application, transaction and enterprise servers beyond M3.

Roughly described, the invention provides an environment that incorporates a Rational Rose compatible UML design tool within a software application design and development product, to comprise an integrated software application, development, and modeling system. One embodiment of the invention can incorporate a software code Generator Framework to automatically generate code related to the design. This software code Generator Framework is described in further detail in co-pending application "SYSTEM AND METHOD FOR COMPUTER CODE GENERATION", application Ser. No. 09/970,741, Inventors Todd Little, Loren Konkus, Gilles Lavalou and Timo Metsaportti, filed Oct. 4, 2001, incorporated herein. It provides a common set of standards and application programming interfaces (APIs) to generate code and configuration files from any data source. A primary goal in developing the Generator Framework is to unify the code generation techniques implemented in the Builder family of products, by introducing sufficient abstraction levels. Built-in (or generic) rules are introduced in the generator framework. A data navigation layer isolates the generator framework from the data sources used. Filters can be added to the framework to transform data. Notifiers are used by the generator framework to notify external components about the generation process.

The Generator Framework is intended to be used in development products such as those produced by BEA Systems, Inc. which includes their Builder family of products. BEA Builder is designed to enable companies to leverage the development skills of their existing programming staff, while substantially reducing the time and costs associated with implementing new applications, such applications being then used primarily for the BEA Tuxedo platform. BEA Builder is a suite of products which address the key aspects of client-side and server-side application development. These include:

BEA Active Expert—A tool that allows the use of popular Windows development tools to create BEA TUXEDO client applications.

BEA C++ Expert—A tool that assists the programmer in writing BEA TUXEDO servers and clients using C++.

BEA Contract Repository—A central repository for the storage of interface information for server-side BEA TUXEDO application components.

BEA Configuration Expert—A tool to quickly and simply generate BEA TUXEDO configuration files without having to know the specific configuration file formats.

As described herein, the invention provides a new suite component or product, referred to herein as BEA Rose Expert. BEA Rose Expert (otherwise referred to as the "Expert System") is a plug-in to the Rational Rose development tool that allows the application designer to leverage the Rose object design environment to build BEA TUXEDO servers and clients using C++. It will be evident to one skilled in the art that other variants of the Expert System described herein can be developed to work with object design environments, and that such systems and tools are within the scope of the invention.

As used herein the term Java™ is a trademark of Sun Microsystems, Inc. The terms Windows™, ActiveX™, and SQL Server™are trademarks of Microsoft Corporation. The terms Rational Rose™, Rose™, Rose 98 Enterprise Edition™, Informix™, and DB2™ are trademarks of International Business Machines (IBM) Corporation. The term RogueWave™ is a trademark of Rogue Wave Software, Inc. The terms WebLogic™, WebLogic Server™, and TUXEDO™ are trademarks of BEA Software, Inc. The term CORBA™ is a trademark of the Object Management Group. The term Oracle™ is a trademark of Oracle Corporation, The term Sybase™ is a trademark of Sybase, Inc.

DETAILED DESCRIPTION

Figure 1:
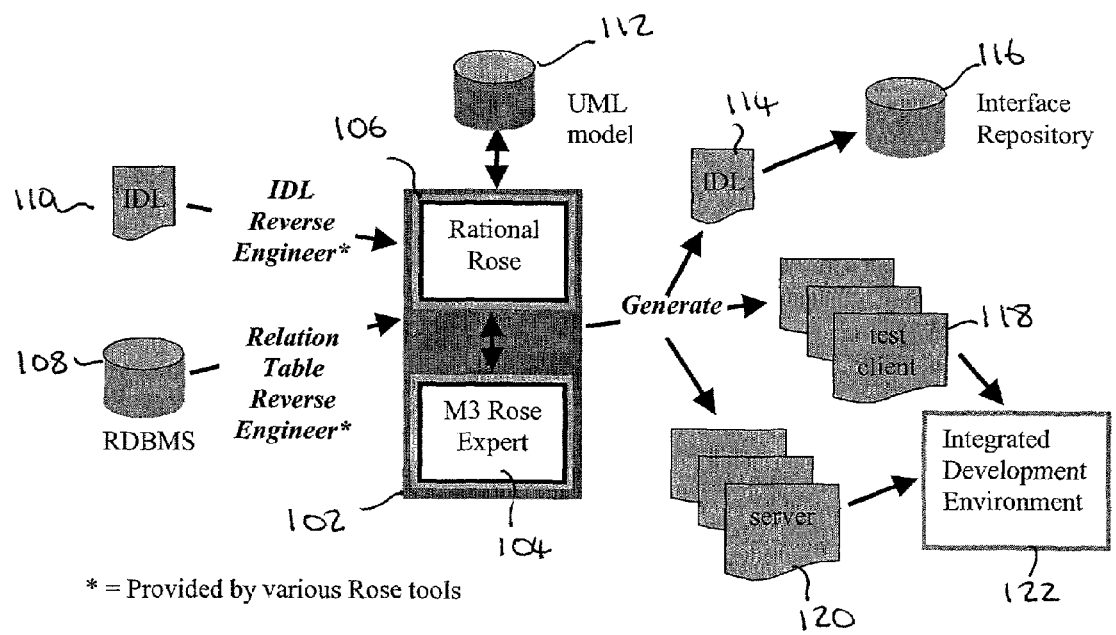
FIG. 1 shows an integrated software development system in accordance with an embodiment of the invention.

In accordance with the invention, a modeling development system which uses UML object modeling is described. An example of such a system is referred to herein as the "M3 Builder Rose Expert System" product from BEA Systems, Inc., San Jose, Calif. The M3 application server product, part of the Weblogic family of products from BEA Systems, is just one example of an application server or transaction server that can be used with the invention. It will be evident to those skilled in the art that the invention may be equally used with other application, transaction and enterprise servers and in other environments that require software development and modeling tools.

The M3 Rose Expert System (hereinafter referred to simply as the Expert System) software product comprises a Rational Rose add-in or plugin that aids in the development of M3 Servers or applications in both Java and C++ that can then execute on all supported M3 platforms. This support includes:

The modification of an application Rose model to conform to certain M3 friendly design patterns.

The generation of Java and C++ implementations for an M3 server described by a Rose model.

The in-place modification of generated Java and C++ implementations to reflect Rose model changes.

The generation of project support files, including interface definition language (IDL) files, and any necessary make files.

The generation of an application test client to verify the integrity of the generated code.

The Expert System is designed to work with Rational Rose, a software design environment available from Rational Software Corporation, although other types of component-based development systems, particularly other flavors of object-oriented or UML design tools, can be used without departing from the spirit of the invention.

Definitions of Terms, Acronyms, and Abbreviations

Design Pattern—A Design Pattern names and identifies a common object oriented design structure. The Expert System includes Design Patterns that improve an application's integration and performance in an M3 environment.

IDL—Interface Definition Language, as defined by the Common Object Request Broker Architecture and Specification.

Interface Repository—The interface repository (IFR) contains the definitions of the interfaces that determine the CORBA client/server contracts. The interface repository has an associated Repository Server (which is an M3 server) which implements the CORBA repository interface.

M3—An application or transaction server, and its equivalents.

M3 Server—An executable program or application that implements distributed CORBA objects for use by client programs.

M3 Application—A set or plurality of one or more M3 servers that are started and administered as an entity and provide related services to clients. A configuration file (e.g. TUXCONFIG) is typically used by a boot program to start all of the elements related to the application describes an M3 application.

Rational Rose—A visual modeling tool from Rational Software Corporation which supports the modeling and iterative development of object oriented applications. Rose supports an Extensibility Interface that permits the integration of development tools into the Rose environment.

UML—The Unified Modeling Language is a diagrammatic notation for modeling object-oriented systems.

Relational Table Class—A class construct that represents a table in a relational database. It contains column definition and get/set methods.

Relational View Class—A class construct that represents a virtual table (usually called view) in a relational database. This construct is frequently used to build customized access. It contains column definitions which is based on one or more existing relational tables.

Composite View Class—A class that represents a combination of relational table and relational view classes as an atomic operation.

Data Entity Group—A Rose category (logical package) that contains a set of classes representing the functionally related entities such as relational table, relational view, and composite view classes.

M3 Builder Data Entity Group—M3 representation of a data entity group that contains a set of data entity packages.

Data Entity Package—A Rose category that contains classes generated by Data Entity Generation feature to enable persistent handling of an M3 object into a relational database.

Object-Relational Mapping—The mapping of an object oriented database schema into a relational database schema.

Relational-Object Mapping—The mapping of a relational database schema to an object oriented database schema. The Data Entity Generation facility of The Expert System is focused on this mapping.

General Expert System Description

The Expert System software product allows M3 server developers to easily use Rational Rose to model their application and to generate M3 servers from their Rose models. Using the Expert System, developers can:

Create a design model for an M3 application.

Generate data entity objects which map to databases.

Validate that the model they have created can be used to create M3 servers.

Generate C++ or Java classes that implement the model they have created.

Generate the supporting project configuration, definition, and build files that are necessary to build and deploy the application.

Generate test client implementations to verify their implementation.

Features of the Expert System product are not tied to a particular modeling tool like Rational Rose. Specifically, its features and concepts are portable to other tools including, for example, Select Enterprise. Code generation can be leveraged into other modeling tools, and can be used to support other server platforms.

Supports development both in a Windows-only environment and in a Windows workstation/UNIX server environment including Rational Rose on Windows 95 and NT.

Supports integration with the M3 Builder ActiveX Client, via generation of M3 IDL source, which can then be used by the ActiveX Client.

Supports integration with the M3 Builder Configuration Expert, and can leverage UML deployment diagrams to provide the Configuration Expert with additional UBBCONFIG information.

Hides the usage of M3 IDL from customers that are not interested in using IDL. It generates IDL from model classes and provides an automated interface to the M3 IDL compiler. It also provides an IFR browser so that customers can see the contents of the IFR. The Expert System generates IDL and automatically calls the appropriate M3 IDL compiler. An IFR Browser is available in the ActiveX Client Application Builder, which can be packaged with the Expert System inside M3 Builder.

Provides a testing framework that generates default object implementations and test clients to exercise servers.

Provides a dynamic sample code generation facility similar to the Builder C++ in areas where normal code generation is not appropriate. The programmer may cut & paste the sample code into their IDE. Such sample code is available in C++, Java, and VB.

Support for regeneration of files where application logic has been implemented without losing the application logic.

The Expert System add-in co-exists with other add-ins from other vendors.

Ability to generate files/components (IDL, make files, ICF, servers) from the Rose model to create M3 C++ servers.

Supports the separation of an application's logical object model into different "views". The programmer is able to describe an "ideal" object model that represents the pure business objects and relates well to application use cases. The Expert System automates enhancing the ideal object model into an "implementation" object model (called "model refinement") that describes all the actual classes in the implementation of the application.

Supports "ideal" logical object modeling in an implementation language neutral form.

The Expert System features supports and reinforces use of a high-level object oriented (OO) development process such as the Unified Process. The system does not preclude the use of any OO development process like Unified Process Supports modeling of all M3 IDL data types.

Supports importing of standard CORBA IDL into a Rose model. This facility is needed to support porting of existing CORBA systems and exposing of non-M3 CORBA components in a model.

Supports a powerful, flexible design pattern facility. This facility presents a library of good M3 design patterns and general industry design patterns that apply to M3. This facility also allows creation of new patterns.

Support for very large models and complex application topologies. Designers may decompose their models using Rose control units and packages to help manage complexity and concurrency. Designers are free to create multiple IDL files which reference each other, and include selected CORBA Interfaces and data types within specific IDL files. In addition, designers are free to describe any number of M3 Servers and M3 Server Groups and associate implementation code with one or more Servers.

Support for multi-user development of M3 Application models.

Supports implementations using C++ and Java, including the ability to define the implementation language for an M3 application.

In a Windows NT-only development environment, The Expert System supports integration with MS Visual C++ for C++ implementations and Symantec Visual Cafe for Java implementations. Integration can take the form of generating project files and navigating from model classes to implementation code.

The Expert System provides design patterns and code generation to map native C++ and Java language exceptions to CORBA exceptions.

Due to large number of existing of RDBMS installations, the Data Entity Generation feature may include support for the relational-to-object mapping.

Data Entity Generation provides the infrastructure to ease the object-to-relational mapping task.

Data Entity Generation supports "ideal" logical object modeling in an implementation language neutral form.

The system may assume that data entity classes in the Rose model map to a single RDBMS table.

Support for easy mapping between M3 and RDBMS data types. Joins may be supported through the use of Relation View class.

Provides for pattern design of data entities to work with existing data modeling products or methodologies in the Rose marketplace.

Ability to generate DBTools API code initially, with ANSI Embedded SQL as the second target.

Performance is the same as hand coded data entities. High performance of generated code.

The data entity object interface is consistent across different RDBMS. Allows access to RDBMS specific features via extensions to the common data entity object interface.

Expose XA functionality of the underlying RDBMS.

Product Functions

FIG. 1 shows an overview of a software development system in accordance with the invention. The software development system or product includes functions and features necessary to support the design, verification, and generation of M3 server applications. As shown in FIG. 1, the complete development system 102 includes the Expert System 104 itself, and a version of the Rational Rose designer 106. The Expert System can be provided as a plugin into a Builder Generator Framework, as described more fully in co-pending application "SYSTEM AND METHOD FOR COMPUTER CODE GENERATION", application Ser. No. 09/970,741, Inventors Todd Little, Loren Konkus, Gilles Lavalou and Timo Metsaportti, filed Oct.4, 2001, incorporated herein. The Rational Rose designer can be used to reverse engineer input database (RDBMS) files 108 and input IDL files 110, for subsequent use in generating servers or applications. A UML model 112 is used to define the server model under design. When the design is completed to the satisfaction of the software designer or developer, the developer can generate the necessary output IDL files 114, which are then stored in an interface repository 116 for later use. A test client 118 or client application, and a server 120 or server application can also be generated. Together these generated client and server applications are used to comprise an integrated design or development environment (IDE) 102.

The functionality of the Expert System is presented in this document from several different perspectives:

User Interface: In one embodiment, the Expert System is a Rose add-in or plugin. This means that the Expert System presents its functionality to users in the form of menus, dialogs, message boxes, and design entity properties.

Application Modeling Process: There is a logical workflow surrounding the design and fabrication of M3 applications using Rose and the Expert System.

Model Import Support: Many customers will be using existing databases and legacy applications in their new M3 applications.

Data Entity Generation: This facility is designed to help M3 software designers to easily access information available in existing relational databases.

Design Pattern Support: The system encourages application developers to follow certain design patterns that leverage the characteristics of the M3 environment and foster the development of high performance transaction servers by including support for them in the Expert System.

Design Model Verification: By checking a Rose design model for consistency and completeness before generating implementation code, the system can help to discover errors earlier in the development process where they are easier to repair.

Source Code Generation: The Expert System applies certain mapping algorithms in the transformation of Rose logical and component views to generated Java and C++ server source code.

The typical audience or user for the invention is a methodical software engineer embarked on a journey to design, model, and implement a large application. This new application will extend and interact with existing applications and databases. Because of the complexity of the application, the user has elected to use a software design tool to aid them in this process. Rational Rose is a typical selection, having the benefit of a good reputation among developers, strong third party support, and the availability of M3 server development tools supporting their language of choice.

Suitably girded, the software engineer begins by enumerating the application environment through use cases and abstract classes. Through research, the environment is captured in Rose and a logical model is divined which, if implemented, will fulfill the application's requirements. As the journey progresses, the model becomes more concrete until it contains sufficient detail that it can be realized as source code.

The invention aids in this journey by providing tools that assist in the refinement and implementation of an application model. The Expert System includes import features that are used to fold existing application and database knowledge into the design model. Design Patterns and the Model Verification tools assist the software developer by performing much of the rote work necessary to complete a model for use within M3. Source code generation creates the implementation from the model and helps to keep the model and source code synchronized. The integration of the Rose model and the Configuration Expert aids the engineer in the deployment and configuration of an application. Together, these tools reduce the time necessary to turn a Rose application model into a prototype M3 Server and ultimately into a production quality implementation.

User Interface

Figure 2:
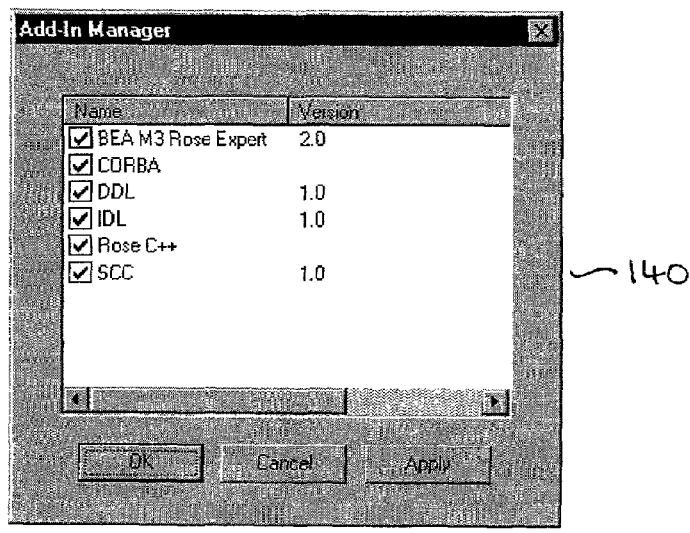
FIGS. 2–3 show screen shots of an integrated software development system in accordance with an embodiment of the invention.

The Expert System can be provided as a "plug-in" into the standard Rational Rose product. As such, the graphical user interface (GUI) for the Expert System is an extension of the Rational Rose user interface. During installation, a "BEA Rose Expert" option is added to the Rational Rose Add-In Manager, as shown in FIG. 2 (140). With "BEA Rose Expert" selected in the Add-In Manager, the "BEA M3 Builder" menu option is added to the Rational Rose "Tools" menu, and the "M3 Builder" and "M3 Builder Data Entity" property tab is added to the Rational Rose property specification.

Figure 3:
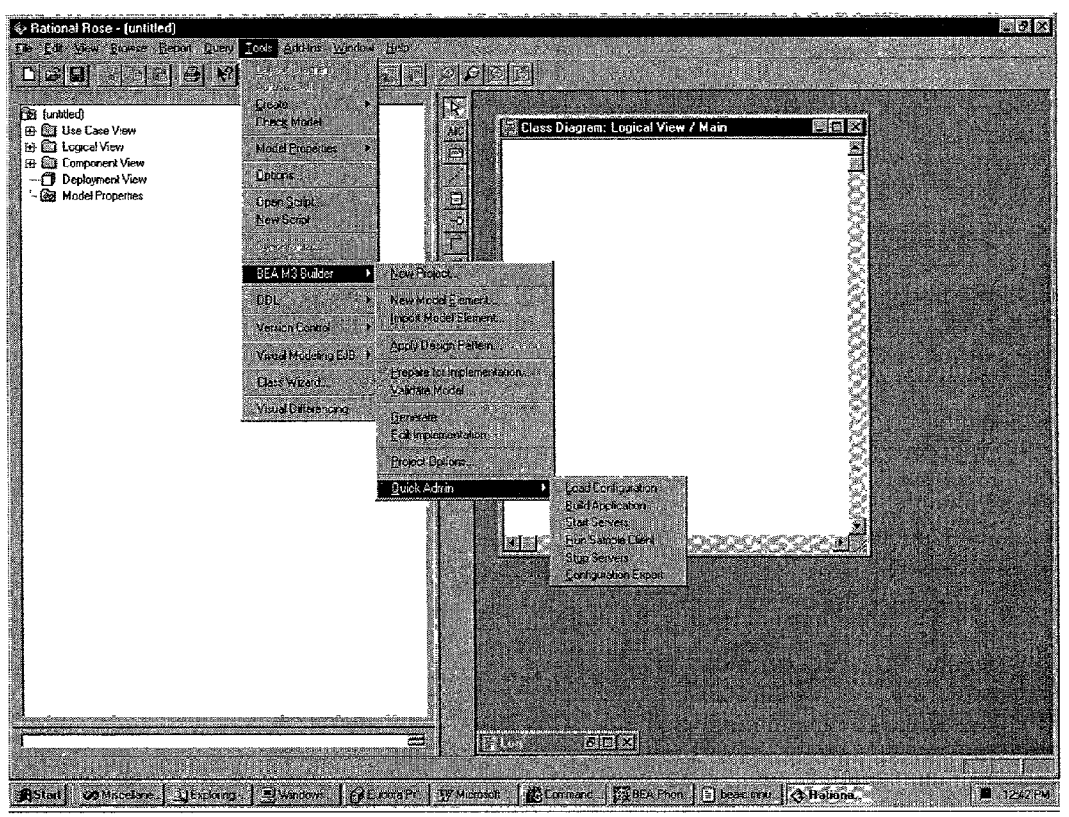
Figure 4:
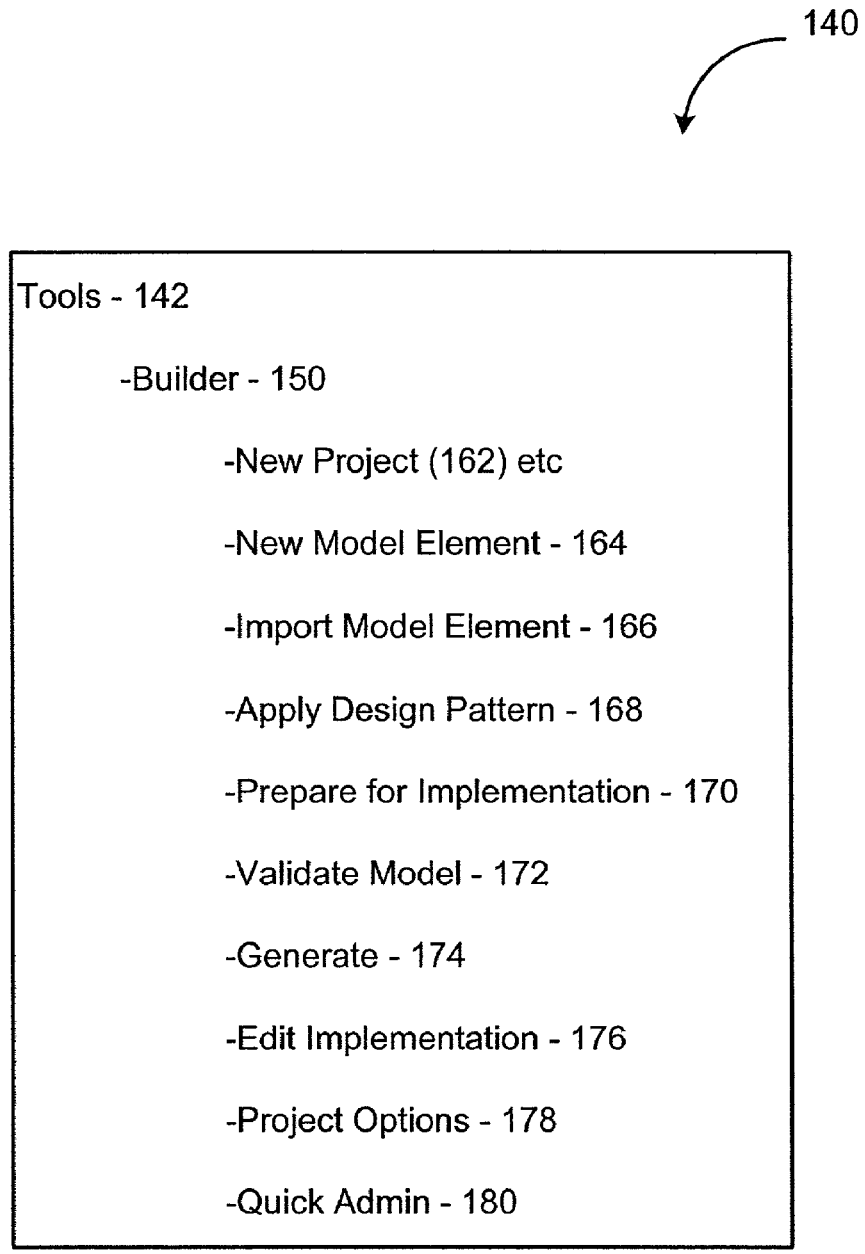
FIG. 4 shows options for use with the Expert System in accordance with an embodiment of the invention.

The resultant menu tree is shown in FIG. 3 (142), the important features or options of which are further listed in FIG. 4. In using the application, selecting the "BEA M3 Builder" entry from the "Tools" menu 160 will lead the user to a sub-menu offering all of the functions provided by the Expert System.

The New Project option 162 guides the user through setting project options and creating M3 Frameworks and/or Data Entity Frameworks in the logical view. M3 Framework is a logical package in the logical view, which contains all of the classes in the M3 Framework. Data Entity Framework is a logical package in the logical view, which contains a set of base classes from which all data entity classes must subclass from. If the "Enable Data Entity Generation" option is selected, a Data Entity Framework logical package in the logical view is created also. The terms "logical package" and "logical view" as they apply to the use of a Rational Rose product are well known to one skilled in the art.

A New Model Element option 164 guides the user through creating a new model element. The element types include Constant, Enum, Exception, IDL, Interface, M3 Server, M3 Server Group, Module, Relational Table, Relational View, Struct, Typedef, and Union.

An Import Model Element option 166 imports schema and data from the RDBMS database to the Rational Rose Model.

An Apply Design Pattern option 168 applies design patterns to the user's application model. These Design Patterns modify the application model to improve its integration and performance in an M3 environment.

A Prepare for Implementation option 170 finishes the current remaining design work. Any changes to the design after this step require Prepare for Implementation to be executed again.

A Validate Model option 172 checks the model for consistency and validity. Validation can not be performed when the model is being constructed. The programmer should run validation frequently, for example, every time they enter a new class or any significant amount of data. All of the validation information is written to the Rational Rose log window.

A Rose Expert generate option 174 allows the Expert System to generate M3 compatible code for the application model.

An Edit Implementation feature 176 uses the a notepad program or other text editor to open the files associated with the components selected in the component diagram.

The developer or user can specify default values for Project Options 178. The values specified therein determine how the Expert System performs the creation of a new project, the model validation, and code generation.

A Quick Admin feature 180 includes the following functions: Load Configuration, Build Application, Start Servers, Run Sample Client, Stop Servers and Configuration Expert. Load Configuration loads the configuration file to the system. Build Application invokes the project build file to build the application. Start Servers boots up the application servers. Run Sample Client invokes the sample client program. Stop Servers shuts down the application servers. Configuration Expert brings up the Configuration Expert application and M3 Builder Tabs in Rational Rose Specification Dialogs.

The Rational Rose interface includes specification dialogs for the packages, classes, components, etc., that are used to define the attributes for these various items. In addition to the dialogs accessible directly from the Tools menu, the Expert System also adds a "M3 Builder" tab to four of these Rational Rose Specification dialogs (Class, Component, Processor, and Component Package.) In Rational Rose, classes are created in the Logical View. Once created, the details of the class can be defined in the Class Specification dialog. In Rational Rose, components are created in the Component View. Once created, the details of a component can be defined in the Component Specification dialog. In Rational Rose, component packages are created in the Component View. Once created, the details of a component package can be defined in the Component Package Specification dialog.

Application Modeling Process

A Model is an abstraction of the essentials of a complex problem, arrived at by filtering out the nonessential details, thus making the problem easier to understand. Visual Modeling is a way of thinking about problems using models organized around real-world ideas. Modeling promotes better understanding of requirements, cleaner designs and more maintainable solutions. Models help a developer to organize, visualize, understand express and create complex things or solutions to complex problems. Successful modeling requires a notation, a process and a tool.

For the visual modeling of M3 applications, one embodiment of the invention uses the Unified Modeling Language (UML) as the notation, an iterative-incremental development life-cycle based process, and Rational Rose Modeler as the tool. Since the Expert System product is designed as an add-in to the Rational Rose Modeler, the rational Rose modeling space forms the basis of the visual modeling of M3 servers. This section briefly discusses some of the conceptual aspects behind the rational Rose Modeler product in relation to the Rose Expert add-in (the Expert System), with special emphasis on the Rational Rose Modeler browser views that are used to design applications.

The Unified Modeling Language (UML) is a visual modeling language supported by rational Rose for specifying, visualizing, constructing, and documenting the artifacts of software systems, as well as for business modeling and other non-software systems. In relation to the Rose Modeler, UML includes the following categories of information and associated types of diagrams:

Use cases—Described by the Use Case diagrams in the Use Case View. The Use Case View of the Rose Browser provides an area to develop use cases, using packages, actors, use cases and use case diagrams. Use Cases are then ranked and scheduled. Scenarios for complex use cases may be developed.

Static Model—Described by Class diagrams in the Use Case view and Logical View. The Logical view and the Use Case View in the Rose Browser provide an area to develop a logical view or representation of the system. The Logical view shows static structures, which consists of classes and the associations among them.

Dynamic Model—Describes the system behavior and illustrates events from actors to systems. Sequence diagrams and Collaboration diagrams are created for use cases to identify system events and system operations. These diagrams are created in the Use Case view and in the Logical View, but generally in the Logical View, since their creation is dependent on the prior development of the use cases. System behavior is a description of what a system does, without explaining how it does it. Behavior of classes are shown using State Diagrams, which are also a part of the Dynamic model. In the Rose Modeler the developer can create state diagrams for classes in the Logical View to depict their behavior and dynamic relationships. State diagrams apply to classes only.

Implementation—Described in the Component View of the Rose Browser. It comprises component packages and task modules (or components). Components are used to depict the grouping of classes in the entities that physically implement their instances. Component diagrams describe the relationships among the various components.

The UML is a modeling language, not a method, and as such has no notion of process. Rational Software has merged their processes (Booch, OMT, OOSE) to create a result called the Rational Objectory Process. It will be useful to first look at a generic object-oriented (OO) development process and its phases, and then OOSE. OOSE is a use-case driven method, which has an interesting notion of the "Ideal Object Model".

Figure 5:
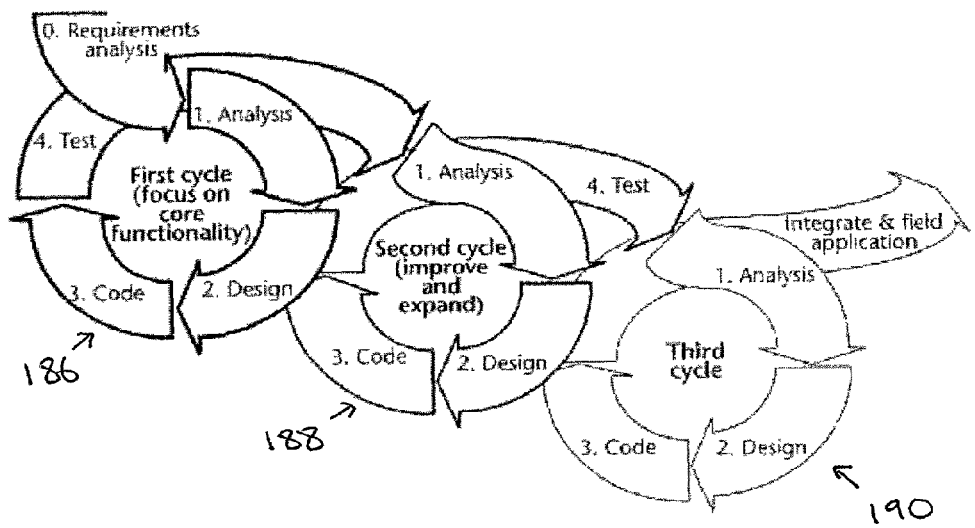
FIG. 5 shows a typical multi-cycle software development process.

FIG. 5 provides an overview of an iterative approach to object-oriented development. The essence of an iterative approach is that the developer develops an application by successive approximations. First they develop a core application—an initial prototype. Then they refine the prototype, improving and extending it. Depending on the complexity of the application, the development process may go through many cycles or iterations (illustrated by design cycles 186, 188, 190).

Figure 6:
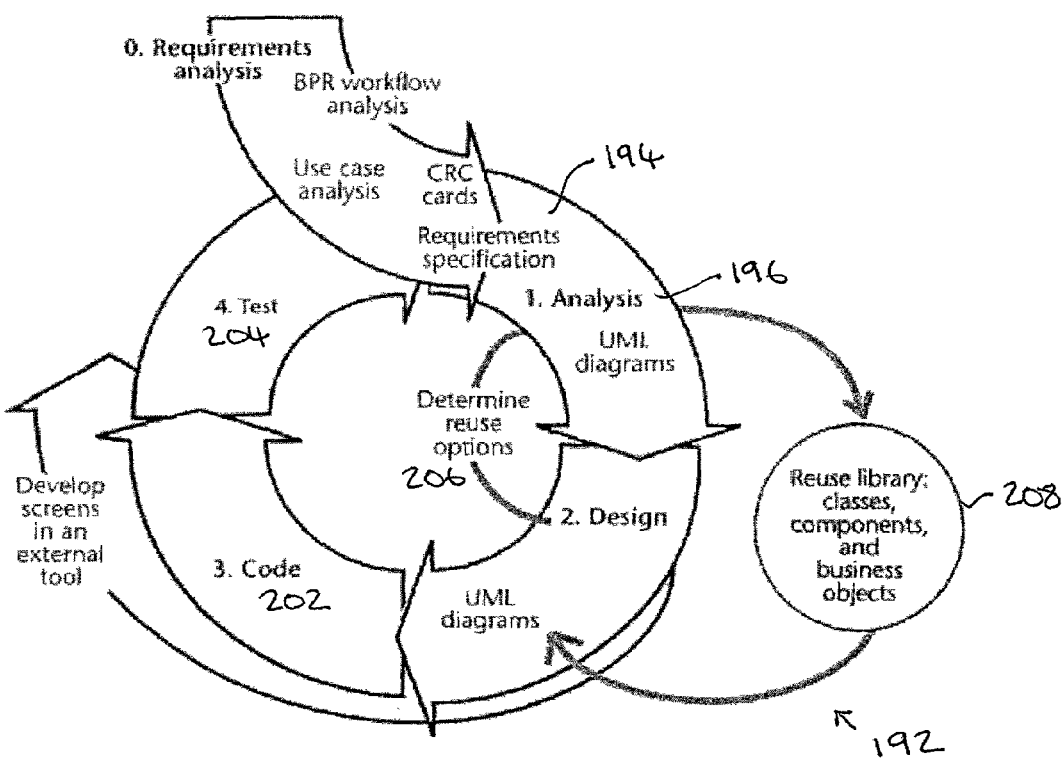
FIG. 6 shows a software development process used by the Expert System in accordance with an embodiment of the invention.

FIG. 6 illustrates an overview of a design process in accordance with an embodiment of the invention. The design process includes the following phases:

Requirements specification 194—The first phase is unique because it begins with a requirements phase that precedes the analysis phase. There are many ways to do requirements analysis: Business Process Reengineering studies, scenarios, use cases, or CRC cards. This phase ends with a requirement specification—a document that provides an overall description of the application to be developed.

Analysis 196—In this phase, a variety of UML diagrams can be used. Some diagrams, for example, class diagrams and sequence diagrams, are used over and over throughout the development effort and keep getting expanded and refined. Others, for example, state diagrams, are only used when the developer encounters particular problems needs to define a specific object or interaction in more detail.

Design 198—In this phase the focus shifts from the logical relationships between objects, to the physical layout of the system. The diagrams used in analysis are extended and information enhanced. Infrastructure objects are added to the business objects that were developed during analysis. In addition, user interaction screens are developed, and any other interfaces required by the system. In object oriented systems, serious "buy versus build" decisions are made during this phase Implementation 202—The next phase in the development cycle begins with the generation or production of code. During the design phase all of the objects in the system have been specified, and probably all of the attributes and most of the operations have been identified. In using the Expert System provide by the invention, the classes and names that have been created during the analysis and design phase become code elements during this phase.

Test 204—The final phase in the cycle involves testing the code that has been produced to see if it functions properly. Depending on the nature of the first prototype, testing may be a formal affair or it may involve fielding a prototype application and determining how users react to it.

During the design process, those options used in the design phase 198 can be fed back into the analysis phase 196 in a reuse or recycle step 206, while library classes, components and business objects can be reused (208) in the creation of UML diagrams. Designing complex software systems in Rational Rose requires the preparation of many different versions of the various types of UML diagrams. However, using the invention the developer does not have to develop all the possible diagrams in a single shot. Instead, they can begin by creating a limited version of the planned system for the first iteration. Then they can refine and enhance the system in future iterations until they arrive at the planned system.

Figure 7:
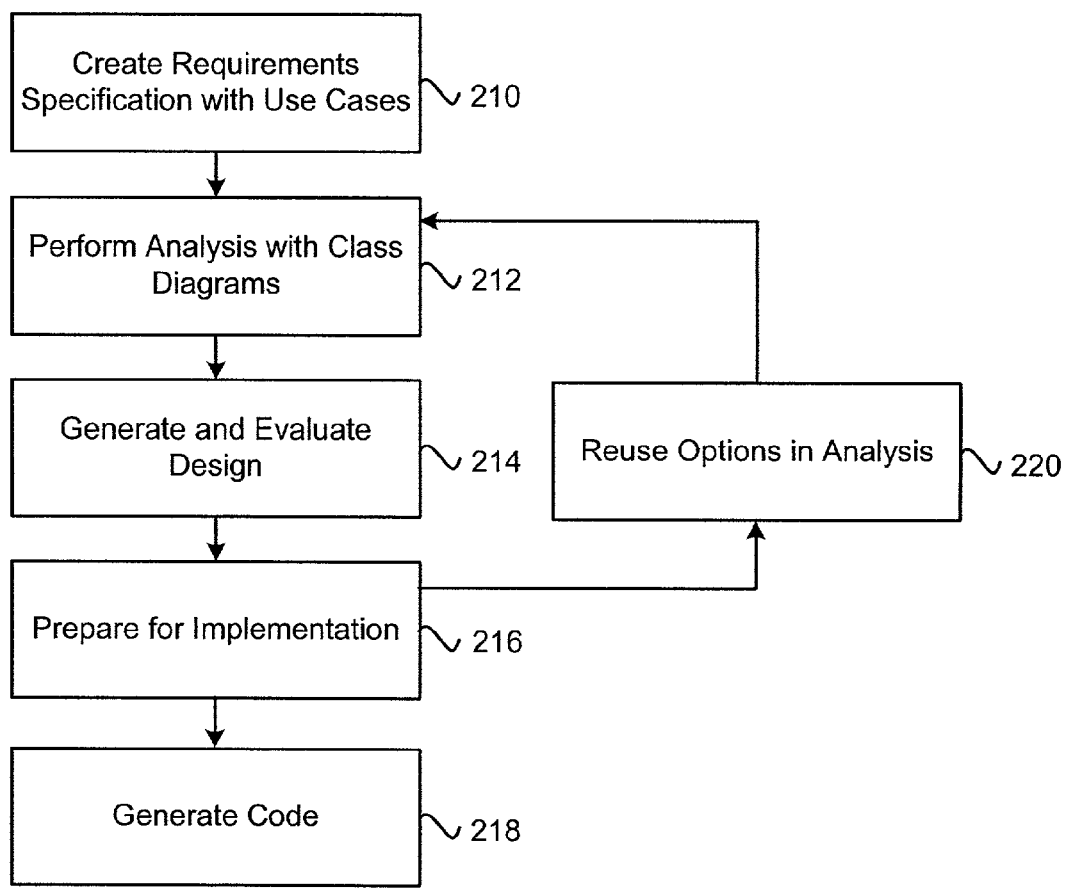
FIG. 7 shows a flowchart of the software development process used by the Expert System in accordance with an embodiment of the invention.

FIG. 7 shows a flowchart of a summary of the design process described above. As shown therein, in step 210, the developer creates a requirements specification with use cases. In step 212 an analysis is performed with class diagrams. In step 214, the design is generated and evaluated, and in step 216, the system is prepared for implementation. In step 218, code is generated and tested. In step 220 options used in the design phase are fed back into the analysis phase for reuse.

Use of the Invention to Model a Typical M3 Application

This section describes the first iteration of the process from the viewpoint of the server application developer, and defines the steps needed to develop a prototype of a M3 application. The example that follows uses an adaptation of a University-related basic sample application that is provided with the M3 software system, and is useful in illustrating the modeling steps.

Requirements Specification with Use Cases

Figure 8:
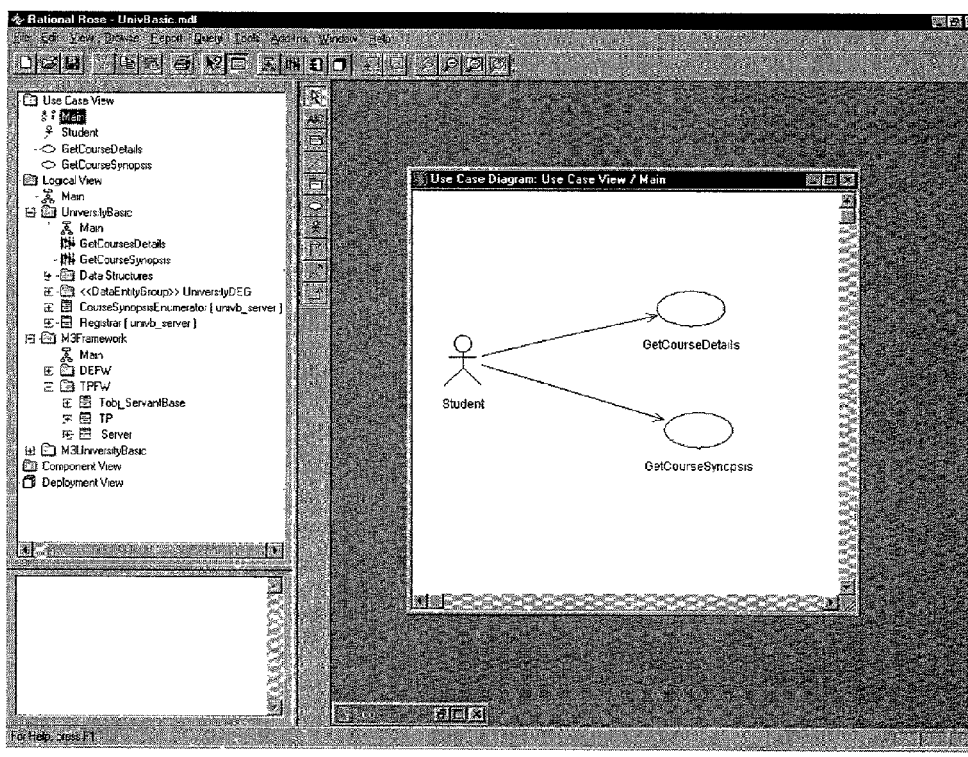
FIGS. 8–13 show screen shots of an integrated software development system in accordance with an embodiment of the invention.

The developer produces the Main Use case diagram and other Use case diagrams as needed. This step is done in the Use Case View Folder of Rational Rose. A use case diagram provides a functional specification of a system and its major processes, and describes the problem that needs to be solved. FIG. 8 shows a use case diagram 221 for our illustrative M3 University basic sample application. The goal is to create a M3 University course registration system that lets a student get a synopsis of all courses that are available to be taken, and the details of a specified list of courses. We document each use case with the use case specification tool. Use cases that have a high rank are tackled in the first development iteration.

Perform Analysis with Class Diagrams

At this point, the developer can convert the use case diagrams into an ideal object model of the system. To do this, we examine the use cases to discover the classes it suggests. During the first pass, these classes would be specific to the problem domain. Based on these classes and their relationship to one another, we create class diagrams. The relationships between classes are shown as association lines. In Rational Rose, we can create class diagrams for each use case. Creating these class diagrams involves a series of steps and is done in the Logical View Folder of Rational Rose. Each major step can be captured as a separate logical package. These sets of logical packages (comprising collections of classes and/or logical packages) would constitute the ideal object model of the application.

At this point in the process, the application designer has completed the external system interactions in terms of Use Cases and a big picture of the application in terms of the various Use Case diagrams and Class diagrams. This ideal object model is then stored as one or more separate Rose Control Units (.cat files).

Figure 9:
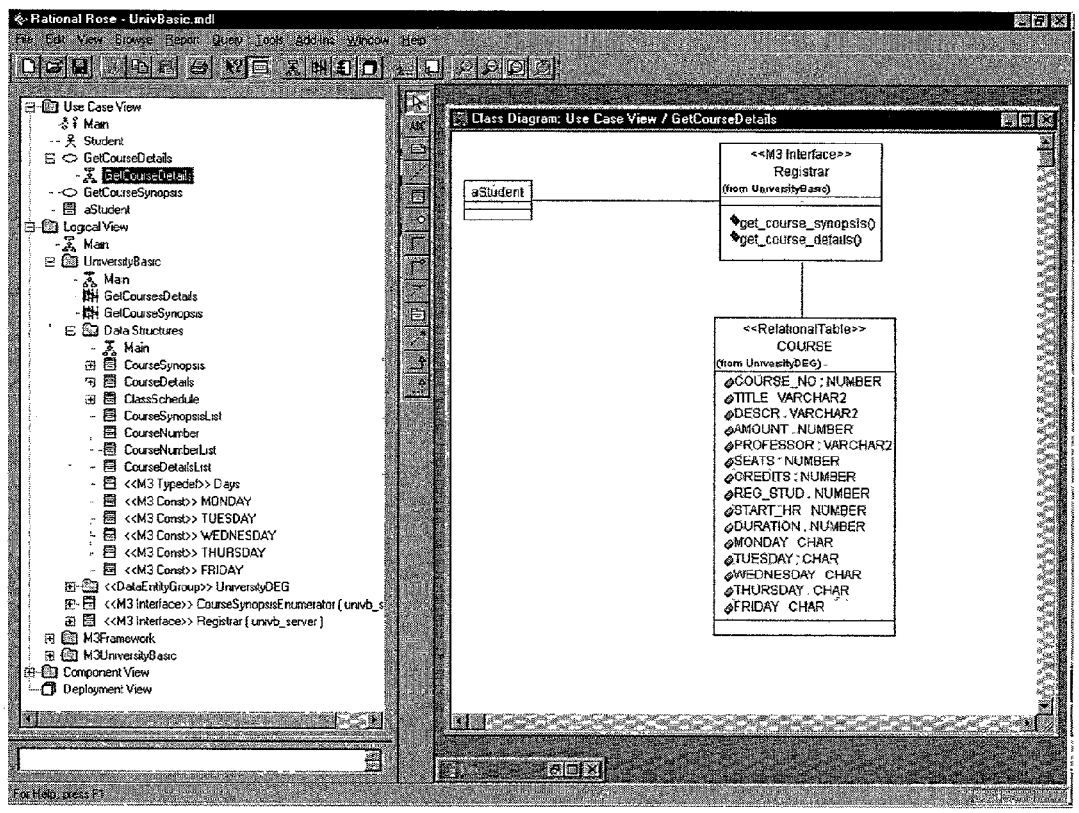

This phase illustrates an important process of inventing new classes, which are not visible directly in the problem domain. These classes are generally called Controller classes and encapsulate control flow logic. In this case, the Registrar class is a new class that we have introduced in this manner. We will use the stereotype of M3 Interface to highlight these classes in our model. Rose classes of the M3 Interface stereotype and the other stereotypes supported by The Expert System can be created using the Create Model Element menu of The Expert System. FIG. 9 shows the class diagram 224 for a GetCourseDetails use case.

Design

In the design phase, we work mainly in the Logical View of Rational Rose to extend and add information to the diagrams produced in the analysis phase. The notation does not change as we move from analysis to design and iteratively back and forth to some extent. The main steps in this phase are:

1. Create class diagrams for the packages created in the Logical view
2. Create classes and define their stereotypes, attributes and operations
3. Apply Design Patterns codified for M3 applications
4. Create component packages, components and component diagrams in the Component View of the Rose Browser. Component packages contain components, which are either IDL modules or M3 servers. Setting the GenerateIDLModule property to true in the IDL tab produces an IDL module. M3 Servers are specified by setting the component stereotype to M3 Server. Components contain interface classes. This is done by assigning interface classes in the component specification dialog.
5. Complete the design process using The Expert System menu command "Prepare For Implementation".

Prepare For Implementation

Figure 10:
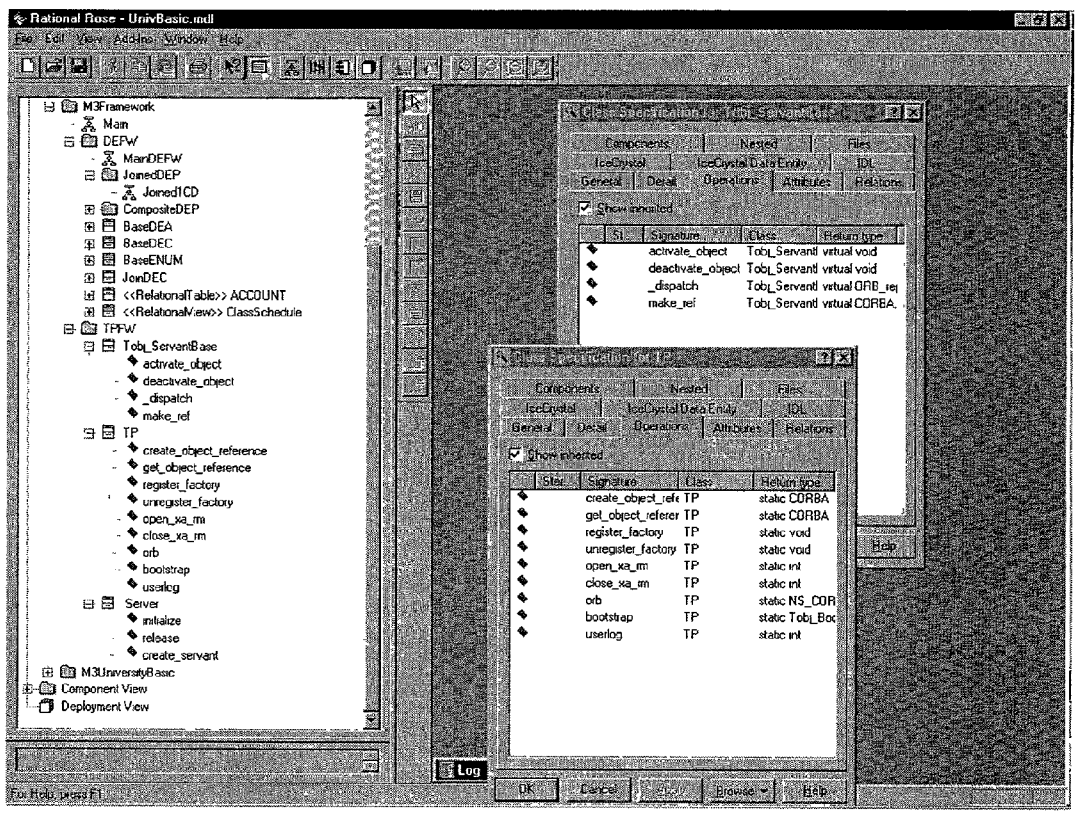
Figure 11:
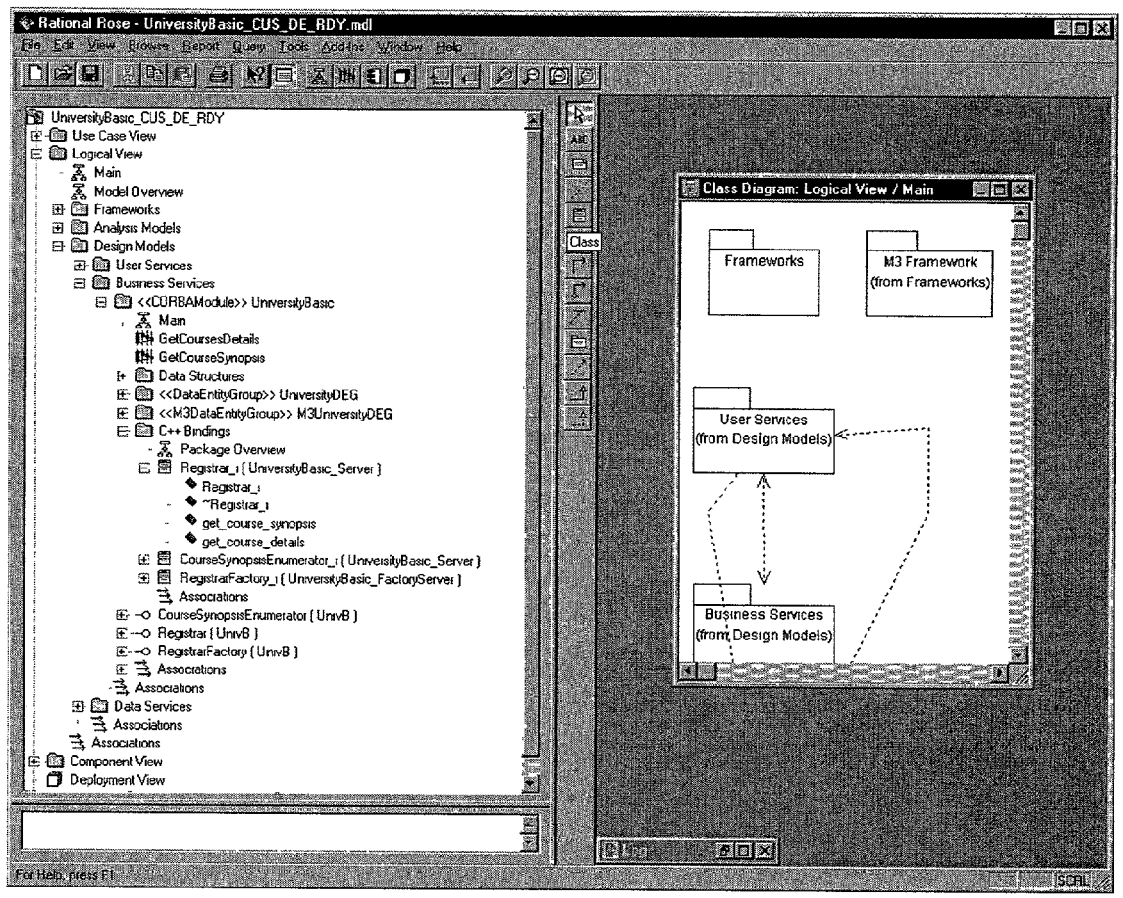

This step is available as a sub-menu of the M3 Builder menu under Tools in the Rose toolbar. It finishes the design work remaining after the prior steps outlined above have been done. Any changes to the design done after this step would require this step to be executed again. The first step in the design process can be performed by a New Project wizard, which creates the M3Framework logical package that contains the base classes of the TP framework and the Data entity framework, some parts of which are shown in FIG. 10 (228). The following operations are performed as a part of Prepare For Implementation:

1. As shown in FIG. 11, a logical package with the name C++ Binding 232 (or Java Binding, depending upon the implementation language) is created at the same level (in the browser tree view) as that of a CORBA interface. The language specific package contains a class for every interface class (at that level) in the ideal object model and for those classes which have been externalized by the way of a relevant design pattern being applied on it. The name of this generated class is the same as that of the interface class with a suffix of _i. Interface classes that belong to the M3 Frameworks package are not included. This class represents a language specific implementation class for a CORBA interface class. M3 server modules realize these implementation classes. The operations of this class are obtained by applying the mappings from CORBA idl to the implementation language. This class can be edited by the user to include information that is not exposed to the external world through the corresponding interface class. These edits are maintained across multiple invocations of the prepare for implementation feature. If the user adds new operations to or changes an operation in the interface class, this feature updates the implementation class.

2. In the Component View of the Rose Browser, it creates a component package called Interfaces with a single component whose name is the project name This component has a language of CORBA. This IDL module contains interface classes that have not been defined by the user but not assigned to any other IDL module. This module has files assigned to it to enable navigation to the generated IDL file. It also allows navigation to the generated client stub source files.

3. In the Component View of the Rose Browser, it creates a component package called <Project name>ServerPkg. It has a stereotype of M3 ServerGroup. It contains a single component with name <Project name>Server. This component has a stereotype of M3 Server and a language which denotes the chosen implementation language (C++ or Java). This module contains interface implementation classes that have not been assigned by the user to any other M3 Server module. This feature enables quick modeling of prototype solutions.

Figure 12:
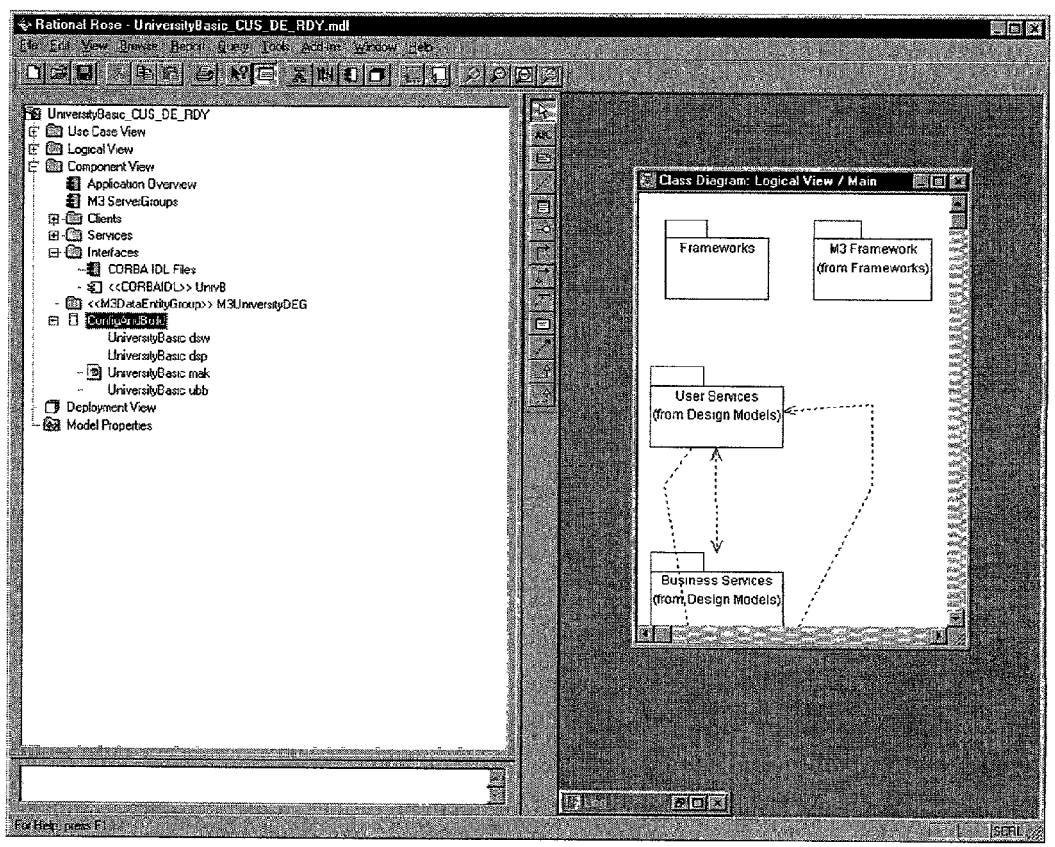

4. As shown in FIG. 12, it creates another component package named ConfigAndBuild 234. This package contains a component which represents the project level source, configuration, and make files. It contains another component representing a simple ubbconfig file that is also generated during the code generation phase.

5. It creates a component diagram called M3 ServerGroups in the component view that is used to show the relationships between the various server groups in the application.

6. For each CORBA IDL module, it adds files corresponding to the generated IDL file and the client stub file, which are produced by compiling the IDL file using an IDL compiler. This allows easy navigation to the IDL file and the client stubs.

Figure 13:
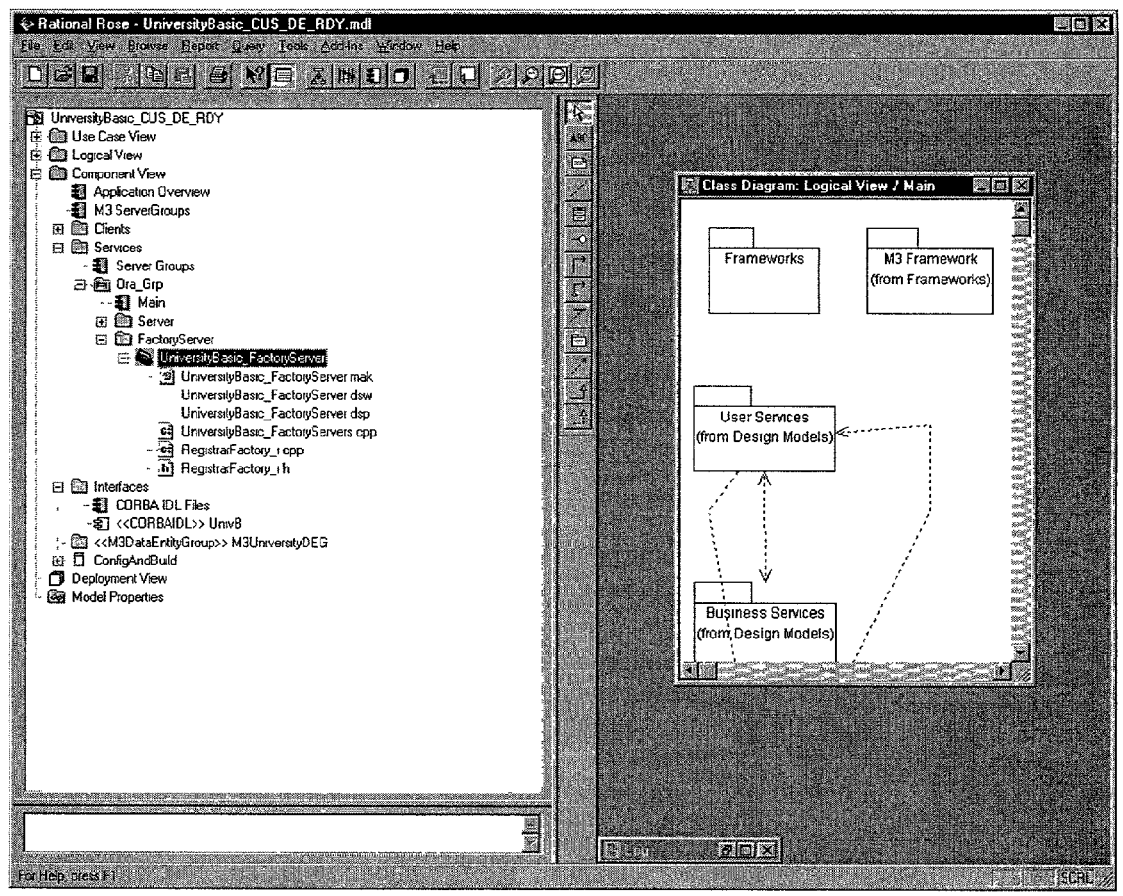

7. For each M3 server module, as shown in FIG. 13, it adds files 236 which hold the servant class implementation files and the make file used to build the M3 server. This allows easy navigation to the implementation files that have to be written for the server.

Although the simple example given above describes a University application, it will be evident to one skilled in the art that the features and processes described can be applied to other applications while remaining within the spirt and scope of the invention.

Data Entity Generation

Many enterprise-level software developers would like to take advantage of object technology to achieve high level of reusability, thus reducing overall development cost. However, to ensure a level of persistence, they may rather use a popular relational database system (RDBMS) which is mature, robust and proven at the enterprise level. Unfortunately, the task of mapping an object technology to relational databases is nontrivial and time-consuming.

The Data Entity Generation feature of the Expert System defined by the invention is designed to help software developers (and particularly M3 customers) to easily create an object layer for access to popular RDBMSs. As such, it provides a relational-to-object mapping (existing relational tables are mapped to objects). Using this facility to create objects to encapsulate RDBMS access provides M3 customers with several benefits:

It promotes reuse of code, thus improving productivity.

It reduces the number of programmers who need to be proficient with RDBMS access languages such as embedded SQL or proprietary procedural APIs.

It reduces the amount and complexity of RDBMS-related coding in an M3 application.

For each relational entity such as a table or a view, the generator creates two C++ classes: The base class, which maps directly to the relational table, comprises of attribute (column) definitions and get/set methods; and the row level access class which provides atomic operations such as create, read, update, and delete at row level.

The Data Entity Generation can create source code that uses the Rogue Wave DBTools.h++ API to perform RDBMS operations. This makes the generated code easier to enhance and allows support of a wide variety of popular databases such as Oracle, Sybase, Informix, DB2, and SQL Server from a single source base.

There are several ways the programmer can extend the generated code: Add custom code to the "protected areas" in the generated "base" classes. These addition will be preserved when the classes are re-generated; and Generate subclasses from the generated base classes and provide additional processing logic or override generated methods. Using these various ways to extend the generated code, the programmer can leverage it to effectively cover all types of RDBMS access used in an M3 application.

The Rose98 Enterprise edition provides a database access add-in to address object-relational mapping and how to create persistent model elements from an existing schema. This add-in uses stereotype to categorize class constructs. The Expert System Data Entity Generation follows this add-in mapping technique and class constructs very closely, and wherever possible, it will reuse the pre-defined stereotypes to represent similar class construct. However, to avoid dependency on these pre-defined stereotypes, the Data Entity Generation introduces a property named "ClassType" in the "M3 Builder Data Entity" tab. The code generation is based on this property value so it is imperative that the property be populated with the appropriate class type. The Data Entity Generation feature can be used in modeling an M3 application.

Figure 14:
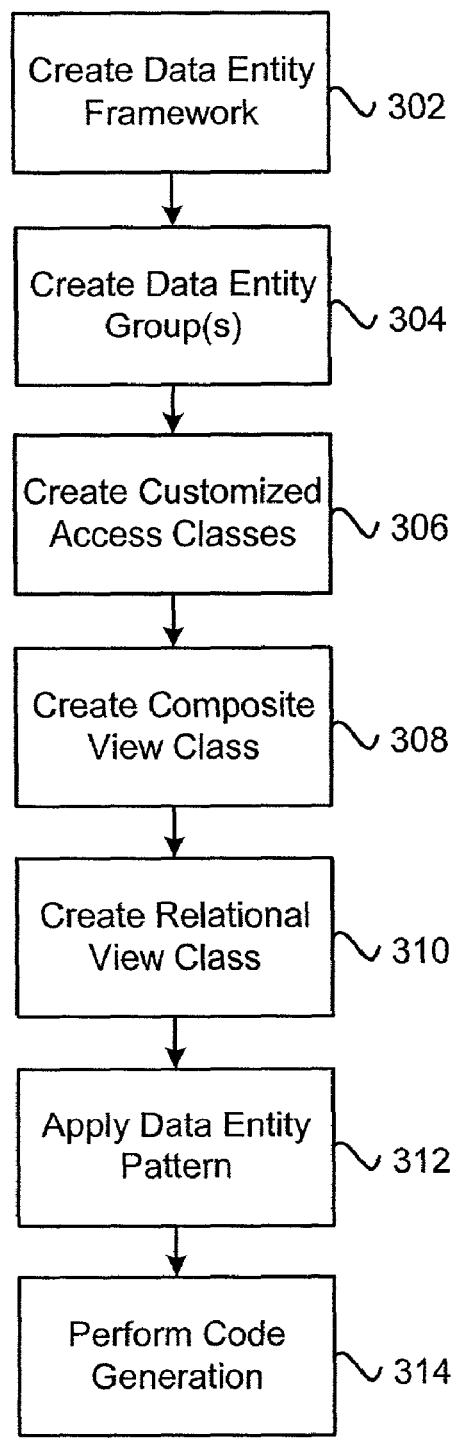
FIG. 14 shows a flowchart of the code generation process used by the Expert System in accordance with an embodiment of the invention.

For ease of illustration, the University sample application is used to demonstrate the detailed modeling steps involved. FIG. 14 is a flowchart showing the steps required to model the application. The steps of FIG. 14 can be considered sub-steps of the generate and evaluate design step 214 of FIG. 7. As shown in FIG. 14, the steps are as follows:

Create Data Entity Framework (step 302)

To create the data entity framework, the programmer invokes the Expert System "M3 Builder=>New Project . . . " menu option. This will, by default, create the Data Entity Framework category in the Rose model. This framework contains a set of base classes from which all data entity classes must subclass from. The existence of this category is used in the Data Entity Generation model validation.

Create Data Entity Group(s) (step 304)

Figure 15:
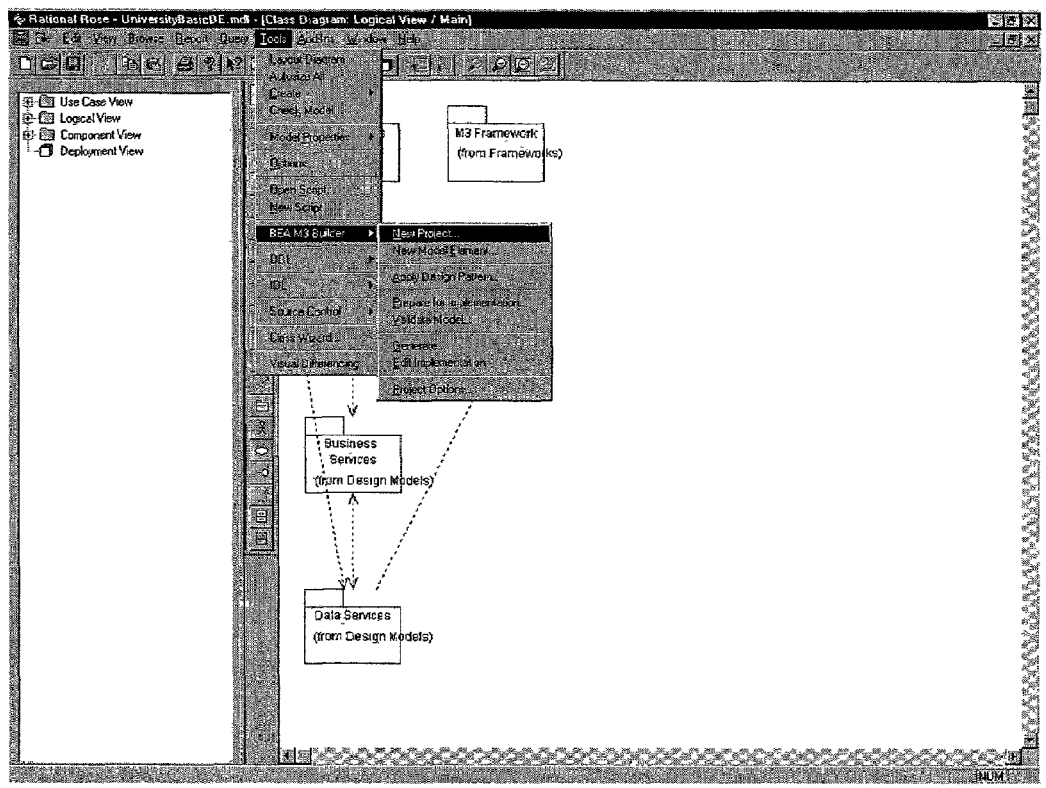
FIGS. 15–23 show screen shots of an integrated software development system in accordance with an embodiment of the invention.

As shown in FIG. 15, the data entity groups 238 are created by invoking the Expert System "M3 Builder=>Import Schema . . . " menu option. Data entity groups represent the logical data model for the application. Each data entity group contains a set of relational table and relational view classes which represent RDBMS tables and views and any customized access definition. In the Expert System environment, a data entity group is represented as a Rose category (or package in Logical View) with the "ClassType" property and stereotype set to "DataEntityGroup". Because the University sample is rather simple, we will only create one data entity group named "UniversityDEG" to hold all data entities. For a more complex system, it is recommended that the programmer modularizes the data entities into subsystems and create data entity groups to represent these sub-systems.

Create Customized Access Classes (step 306)

Figure 16:
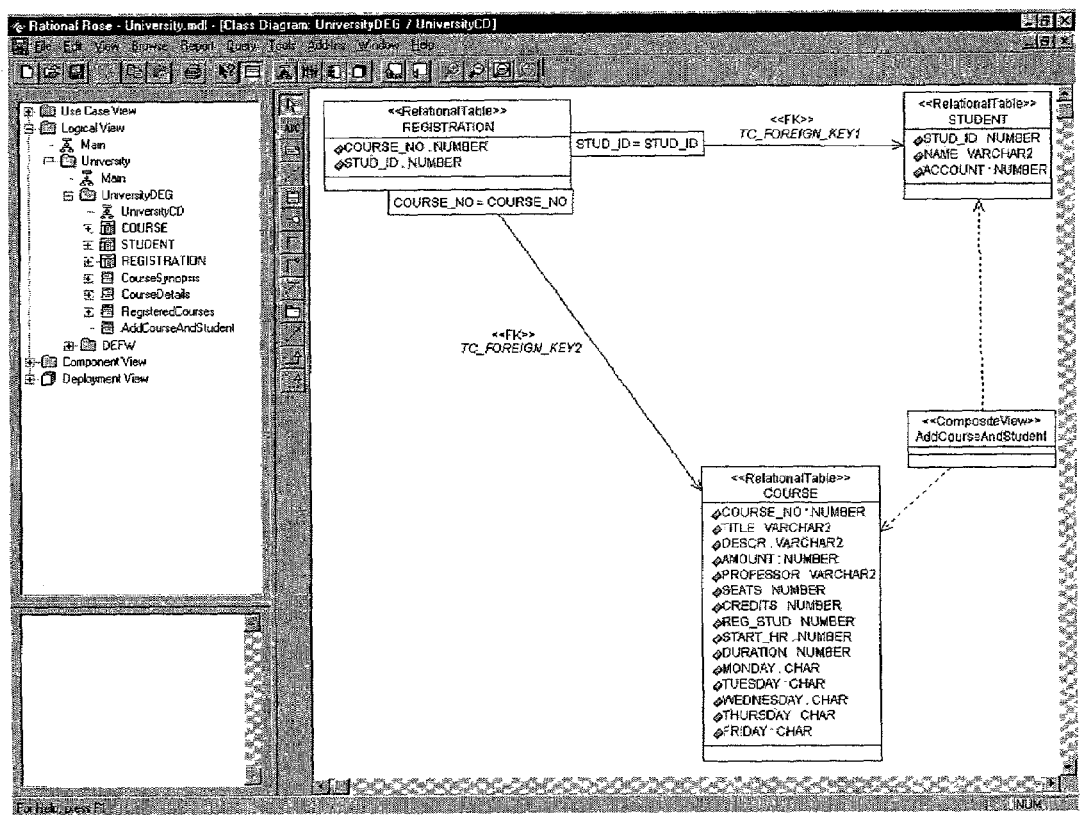

To accommodate customized data access, the programmer can create custom access classes 240, illustrated in FIG. 16. In step 306, the programmer creates the relational table classes and a class diagram to show the relationship between them. A utility may be provided to import these entities from the RDBMS into the model. Customized access definition can be defined as well. These are created by defining relational view or composite view classes in the data entity group.

Create Composite View Class (step 308)

Composite view class deals with multiple table operation. The "AddCourseAndStudent" class will add one entry in the Course and one in the Student table. We use dependency to represent the relationship between a composite view class and the relational table classes involved.

As mentioned, both the stereotype and "ClassType" property value 236 are set to "CompositeView". And we also see that the Entities property is set to "COURSE;STUDENT" to indicate that this class will interact with these two entities. The "Updatable" property 238 is set to "True" to indicate that database update is allowed for this class.

Relational View Class (step 310)

Figure 17:
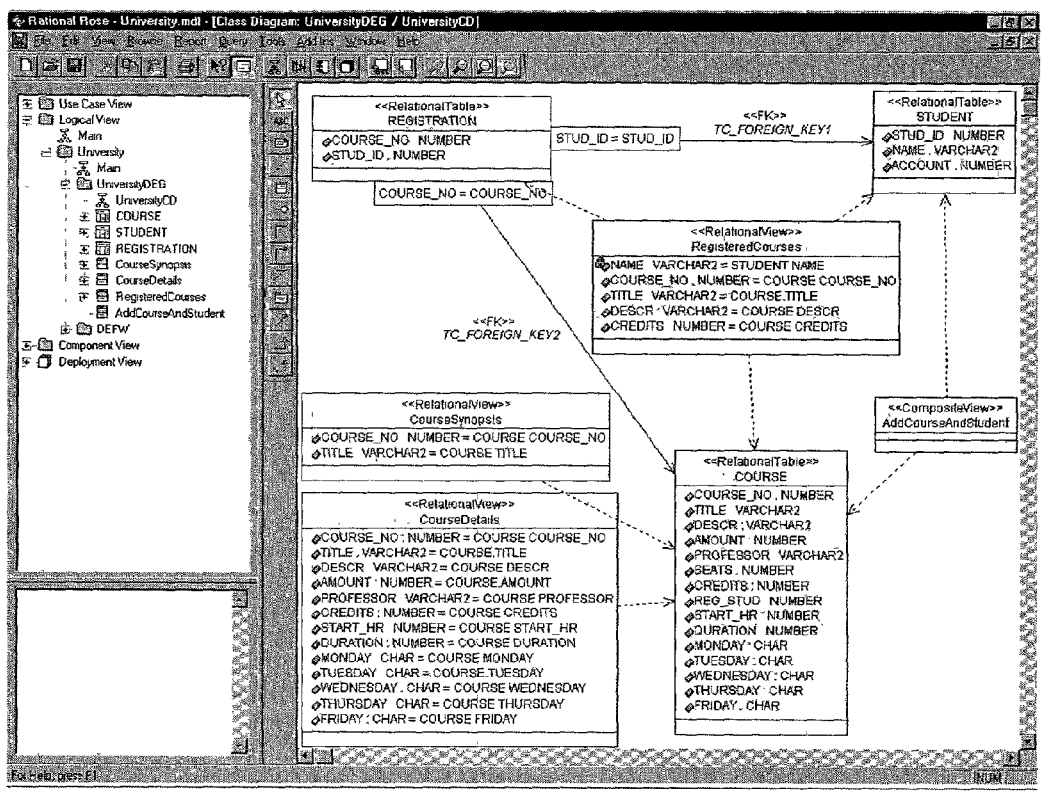

To build customized access other than composite view class, the programmer creates relational view classes 242, as shown in FIG. 17. Each relational view class represents a standard construct for creating a virtual table based on one or more existing relational table classes.

For the University application, we create three relational view classes: CourseSynopsis, CourseDetail, and RegisteredCourses. The CourseSynopsis and CourseDetails are special views of the Course table. The RegisteredCourses is a joined query class.

Again, the "ClassType" property value should be the same as the stereotype, which is "RelationalView".

For a relational view class which composes of columns from more than one table (multi-table view which traditionally represents a joined query), the "Updatable" property value is set to "False".

For an RDBMS, a multi-table view is not updatable. However, for future releases of ORDBMSes, it is very likely that the programmer can update a multi-table view.

Apply Data Entity Pattern (step 312)

Figure 18:
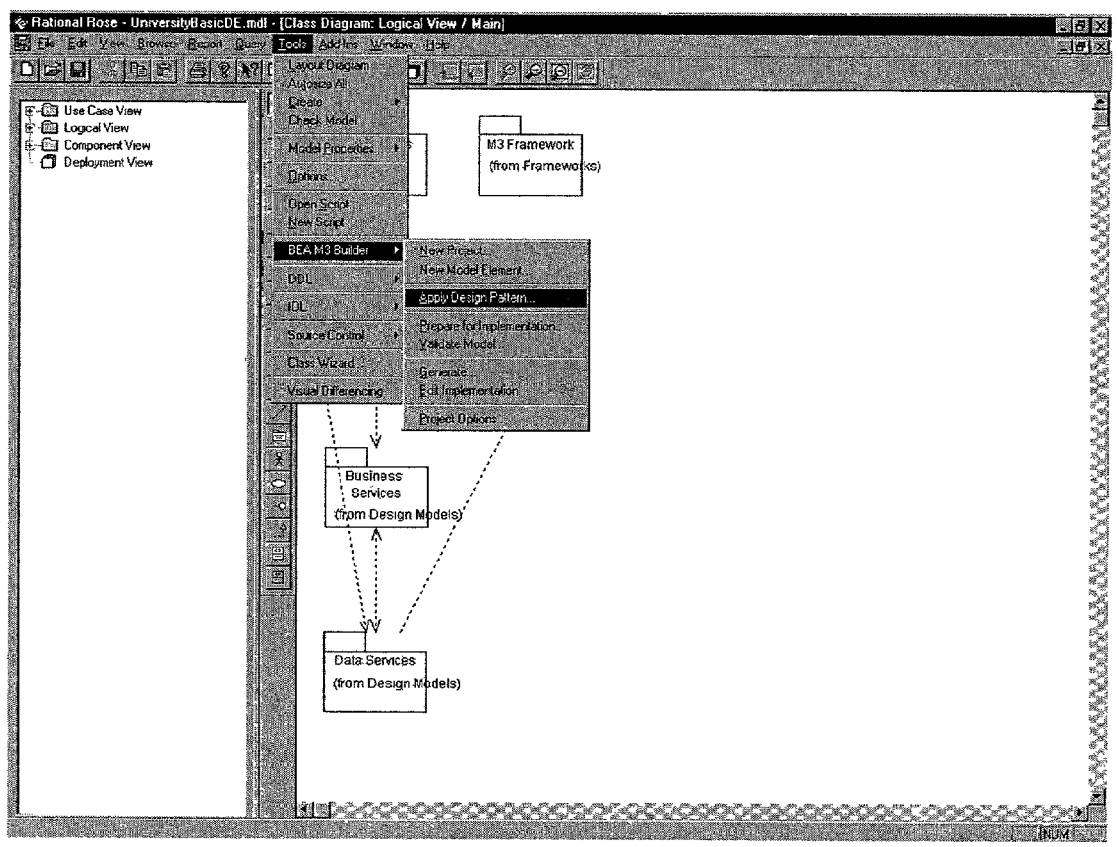
Figure 19:
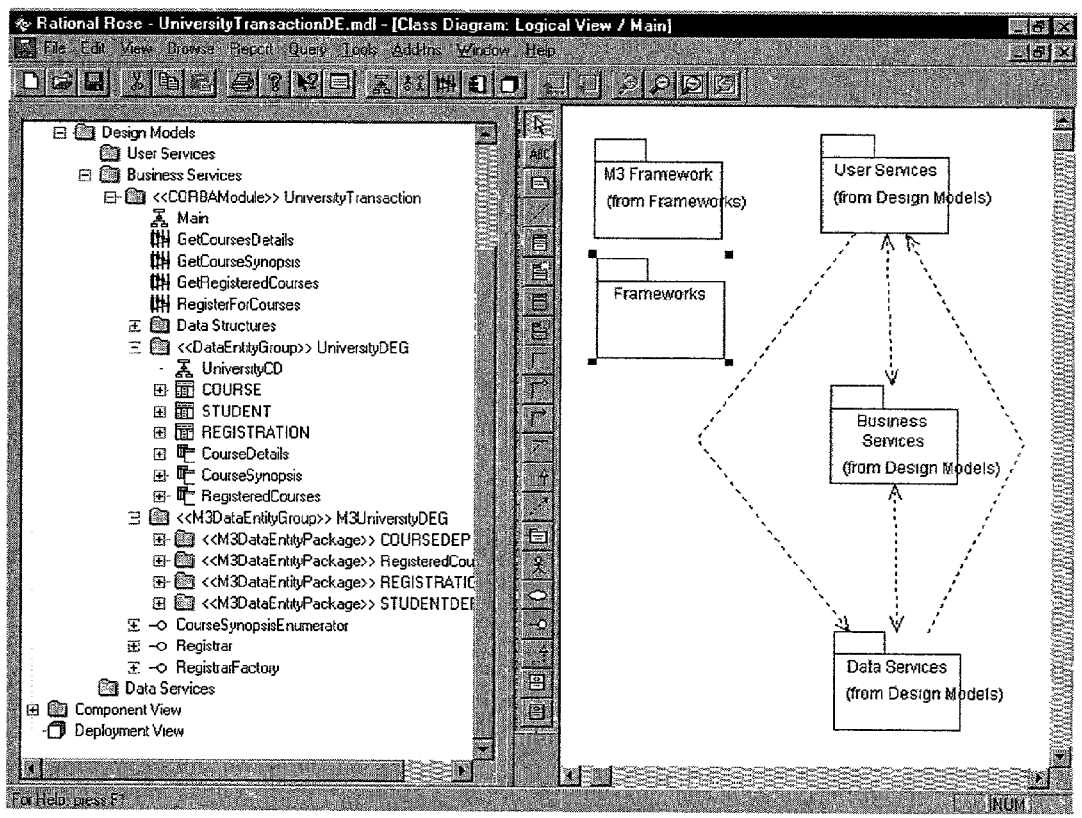

After creating the data entity group(s), the programmer invokes the "M3 Builder=>Apply Design Pattern . . . " to generate/update the M3 representation and implementation of the persistent model defined as shown in FIG. 18(244). The programmer can apply the Data Entity pattern to either a data entity group or a relational entity. The following will happen:

A logical package is created for each data entity group if one does not already exist. Each package is the M3 representation for the defined data entity group and has the same name as the original data entity group prefixed with "M3". For the University example shown in FIG. 19, a logical package named "M3UniversityDEG" 246 is created.

Figure 20:
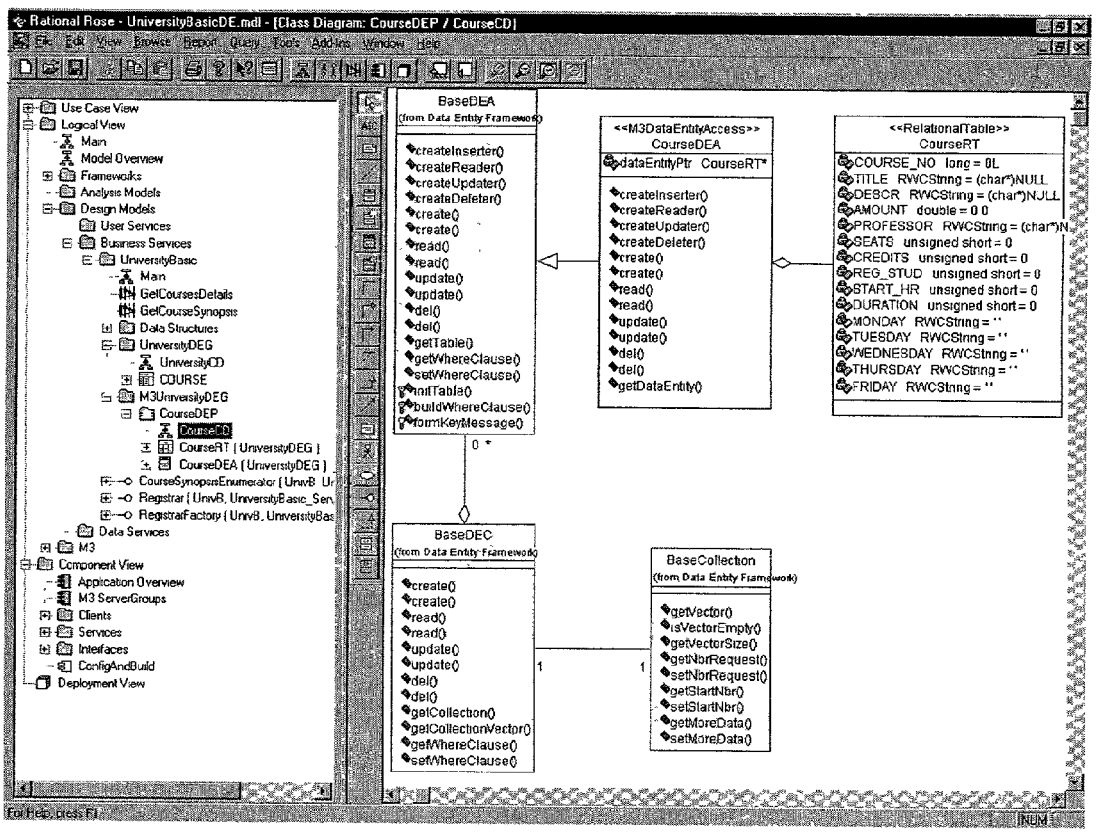

For every relational table, relational view, or composite view class, a data entity package is created in the M3 Builder data entity group representation as shown in FIG. 20. For example, the CourseDEP 248 is created to represent the Course table. Inside this data entity package, a class diagram, a relational entity and an access class are created. The class diagram represents the actual pattern being applied to the relational entity. The relational entity named CourseRT contains the actual column representation and get/set methods (which are not shown). The access class named CourseDEA holds the interface to the relational base class.

The class diagram show the relationship of the generated classes and the classes coming from the framework. In general, this is the pattern that we use to handle the RDBMS-Object mapping for The Expert System.

This step involves creating/updating the equivalent M3 Builder data entity group(s) in the Logical View. Each generated M3 Builder data entity group contains a set of data entity packages which map to the relational table and relational view classes. The M3 Builder data entity group has the "ClassType" property and stereotype set to "M3DataEntityGroup". The package name is the same as the data entity group prefixed with "M3". For each relational table class, a data entity package is created inside the corresponding M3 Builder data entity group. This data entity package has "ClassType" value and stereotype of "M3DataEntityPackage". This data entity package contains the following:

A class diagram which depicts the relationship of the relational table class, its access class, and some of the Data Entity Framework classes.

The relational table class which is a direct mapping of the relational table, get/set and support methods. This class has "ClassType" property and stereotype of "RelationalTable".

The access class which provide row-level basic operations such as create, read, update, and delete. This class has "ClassType" property and stereotype of "DataEntityAccess".

For each relational view class, a data entity package similar to those for the relational table classes is created. The only difference is that instead of having the relational table class, we now have the relational view class. This class has the "ClassType" property and stereotype of "RelationalView". This is another Rose Oracle8 add-in stereotype.

For each composite view class, a data entity package similar to those for the relational table classes. The only difference is that instead of having the relational table class, we now have the composite view class. This class has the "ClassType" property and stereotype of "CompositeView".

Prepare for Implementation (Step 313)

The next step is to prepare the model for implementation. This is done by invoking "M3 Builder=>Prepare for Implementation . . . ". This step involves creating the M3 data entity groups in the component view. All implementation details such as physical source files, make files, libraries are populated in all corresponding model components.

Figure 21:
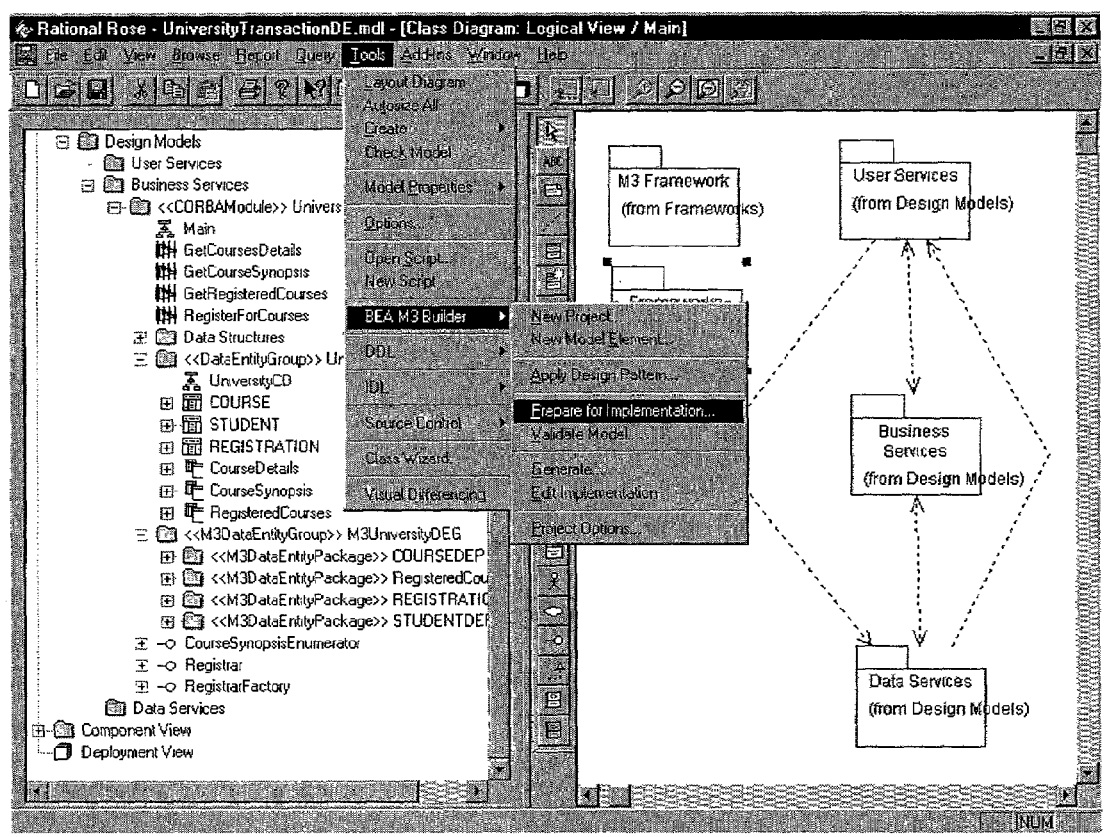

Once the M3 data model has been created, the programmer invokes the "M3 Builder=>Prepare for Implementation . . . " 250 (shown in FIG. 21) to create the physical representation of the data model in the Component View. However, this step will be automatically activated by the code generation process.

Figure 22:
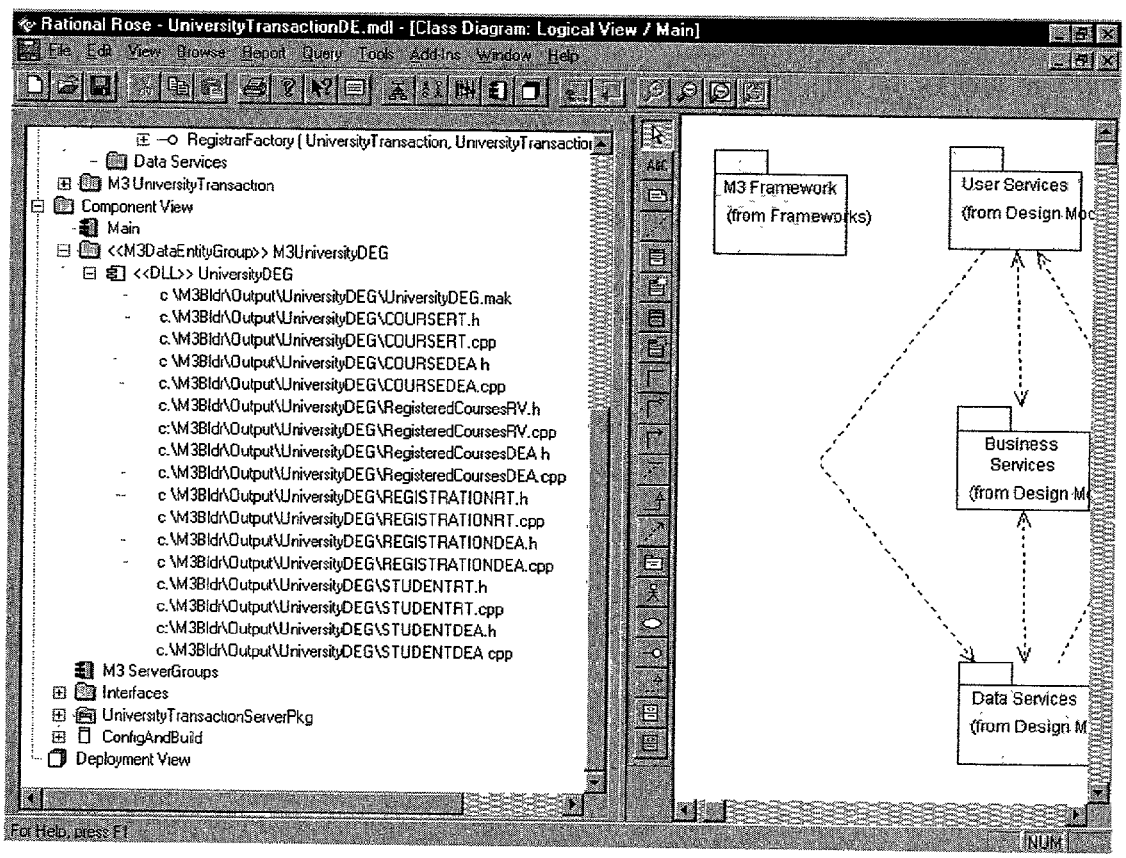

A component package is created for each data entity group if one does not already exist. This component package represents the M3 implementation for the defined data entity group and has the same name as the M3 logical representation. For the University example, a component package named "M3UniversityDEG" 254 is created, as shown in FIG. 22.

The "UniversityDEG" is the implementation component represent the generated classes in the form of a library. The programmer can set the "LibraryType" property to either "Static" or "Dynamic" to indicate whether the library should be static or shared, respectively.

Code Generation (step 314)

The very last step in the process is code generation. This is done by invoking "M3 Builder=>Generate . . . ". The code generation involves 2 separate processes: prepare for implementation and code generation. The first step is to prepare the model for implementation. This step involves creating the M3 data entity groups in the component view. All implementation details such as physical source files, make files, libraries are populated in all corresponding model components. The source files for each data entity group is generated in a separated subdirectory.

Figure 23:
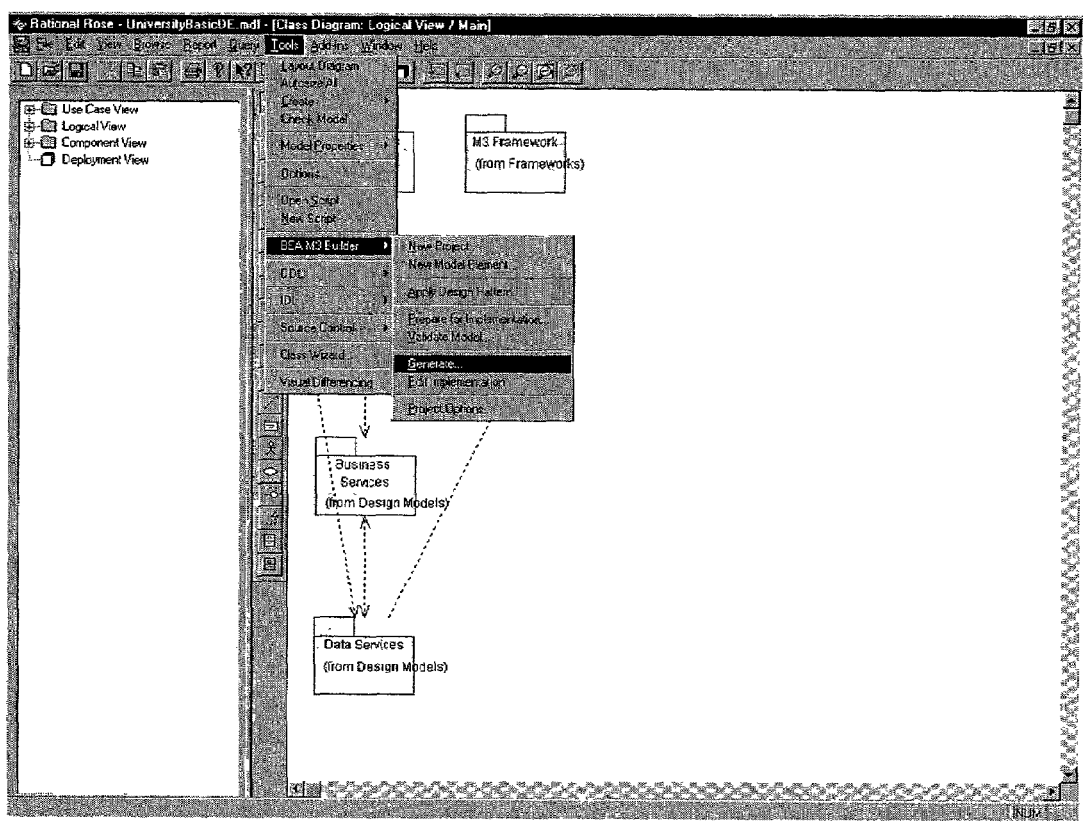

Once the modeling is done, the programmer would generate 256 (shown in FIG. 23) the data access code for the application. This process involves creation of directories if they do not already exist, and generation of data access C++ source, make files.

By default, data access code for each selected component package (which map to a logical package with stereotype "Data Entity Group") is generated in a separate directory.

Extensibility

As mentioned previously, the programmer can extend the generated code in several different ways to provide very powerful and robust data access handling:

apply changes to the template to achieve global effect, in other words, the changes are made to all generated data access classes.

apply the modification into the protected code areas of a particular class for changes that are local to a particular class.

subclass from the generated classes and introduce the customized behavior in the subclass. This allows the generated class be refused in its original form.

Design Pattern Support

A Design Pattern names and identifies a common object oriented design structure. A popular definition of a pattern is that it is "a solution to a problem in a context", in which "context" refers to a recurring set of situations in which the pattern applies; "problem" refers to a set of forces—goals and constraints—that occur in this context; and, "solution" refers to a canonical design form or design rule that someone can apply to resolve these forces.

The Expert System provided by the invention includes the capability to apply Design Patterns to a user's application model. These Design Patterns modify the application model to:

Improve its integration

Improve its performance in an M3 environment

Assist the designer in developing their model

Design Patterns as used in the Expert System are divided into 3 broad categories. The first category is referred to as Core Patterns. These patterns utilize fundamental features of M3 that are required to build M3 applications. Their intent is to ensure that the user's M3 application adheres to the required modeling conventions necessary to ensure that code is generated correctly. In general, the results of applying Core Patterns require little additional work on the part of the designer.

The second category of Design Patterns is called Helper Patterns. These patterns try to assist the designer in modeling their application. They are called Helper Patterns because they tend to produce only a start of a design and require additional effort on the part of the designer to ensure that the design is robust and scalable. In general, these patterns take some information from the model and produce new elements from that information.

The third category of Design Patterns is called User Patterns. The Expert System has the support necessary to add in new design patterns. These patterns, like all other patterns, can manipulate the Rose model, provide a user interface to collect information, and can participate in code generation. A developer may make use of this capability to develop patterns unique to particular industries or customers.

Patterns may be applied to a Rose model by selecting a model element (typically a Class) and invoking the Pattern by using the menus in the Expert System. System developers and end-users or customers may add support for design patterns. System developers and customers may also add new design patterns to the Expert System. Design patterns are evolving as experience with them matures. As improvements are made to design patterns or new design patterns are discovered, it is desirable to have the Expert System support them. In addition, customers may have particular design patterns that are unique to their company or industry.

A user provided design pattern takes the form of a Java class that implements the DesignPattern interface. In addition to being able to manipulate the model through the application of a design pattern, users are able to modify or add their own templates and rules necessary to generate any code associated with the design pattern.

Core Patterns—The Factory Pattern

There are several common patterns that may be used to create new instances of objects. M3 encourages the use of Factories in its architecture and implementation. Factories are object instances that create other objects. The basis of Design Patterns and their use is further described in "Design Patterns: Elements of Reusable Object-Oriented Software" by Gamma et al., hereby incorporated by reference.

Factories are the primary means by which distributed objects are created in an M3 application. How the objects are created and how they are distributed across servers is largely determined by the factory that creates the instances and sets their associated object key. This pattern helps the designer in using the facilities provided by M3 to create object factories. The design created may need some editing and the developer may have to add code to the factory method implementation to initialize instances.

Factories produce instances that adhere to a specified interface. The operations that produce these instances are called factory operations. A factory can have one or more factory operations that produce instances for one or more interfaces. As each factory requires an object reference, it may be desirable to reduce the number of factories by having fewer factories that can create multiple kinds of instances. Factories can either produce new instances or find existing instances. Lookup operations that retrieve or find existing instances are typically associated with factories and can be added by simply adding those operations to the factory class.

Figure 24:
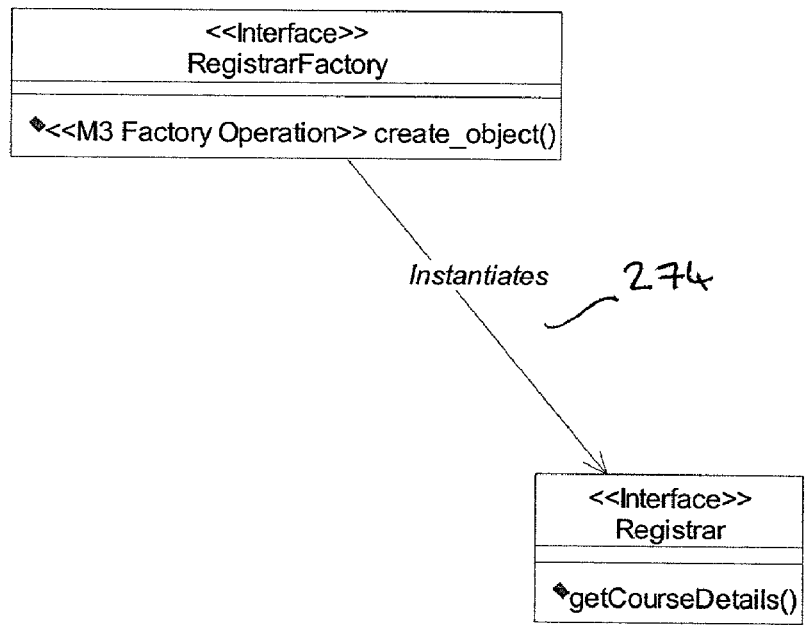
FIGS. 24–28 illustrate the use of various design patterns as used by the Expert System in accordance with an embodiment of the invention.
Figure 25:
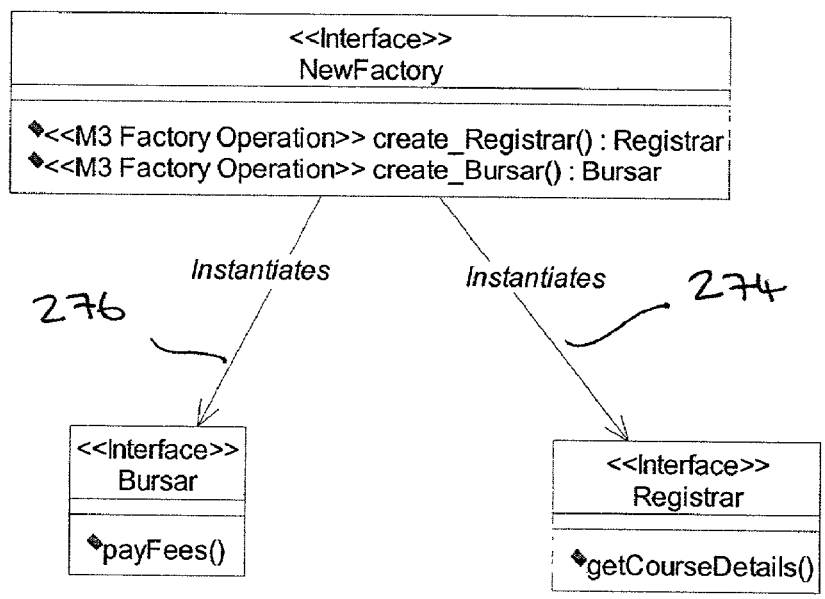

The Expert System menu includes the ability to apply the Factory pattern to a specific class in the Logical View. This pattern has the following effect:

1. Creates a new Class. If being applied to a single class <class_name>the new class will have the name <class name>Factory. If being applied to more than one class, the new factory will simply be called NewFactory.
2. Populates the factory class with a factory operation named create_object( ) that returns an instance of <class name>if the pattern is being applied to a single class. If it is being applied to multiple classes, a factory operation for each class will be added to the factory class with the name create_<class_name>returning an instance adhering to the <class_name>interface.
3. Marks the factory class with properties to ensure that it is included in the generated IDL, and Java or C++ implementations.
4. Marks the source class(es) so that it is also included in the generated IDL.
5. Creates an association from the factory class to the source class(es) with the name Instantiates, as shown 274, 276 in FIGS. 24 and 25.
6. If the source class is included in a Server, mark the new factory class to be included in that server.
7. Causes factory registration code to be generated in any servers that include the factory class.

After the application of this pattern, designers are free to further modify the constructor operation specification to include any necessary selection and initialization parameters. Applying the Factory pattern has the side effect of making both the source class and the factory class external. If a designer should wish to use this pattern in conjunction with a Distribution Adapter (DA) pattern, they should apply the DA pattern first and then the Factory pattern to the synthesized DA class.

For servers including the factory class, the initialization code generated takes care of registering the servant and the factory. The create_object method implementation will be stubbed out with code to create a default IOR. For factory based routing, a class with a stereotype of M3 Routing defines the routing specification. The routing specification class has a single attribute that defines the field name, field type, and ranges, using the attribute name, attribute type, and initial value respectively. An interface that participates in factory based routing has a property on the M3 Builder tab named FactoryRouting that specifies the name of the routing specification class. The code generated for a factory participating in factory based routing will create the NV list and leave a place for the user to add the routing criteria. For all factories, the necessary code to construct the IOR will be present, although the user may want to edit the way the object ID is constructed.

The Distribution Adapter Pattern

The Distribution Adapter pattern may be applied to a local class in the application to create an Adapter class that will be exposed to M3 clients. The design pattern "Adapter" is described in several contemporary pattern books and is a term known to one skilled in art.

An Adapter converts the interface of a class into another interface that clients expect. Application of the Adapter pattern does not necessarily imply the behavior of the new client interface. The resulting Adapter interface may have exactly the same behavior as the original, or it may be different. The Adapter pattern can be used in many situations:

When you are reusing an existing class and its interface doesn't match what you need.

When you need to interact with a non-object implementation using objects (the Wrapper pattern).

When you want to create a reusable class that cooperates with other classes that have incompatible interfaces.

When you have a complex class and you want to present a simpler interface to clients.

When you need to separate the client interface of an object from its implementation so each can evolve independently.

The Distribution Adapter pattern is a specialization of the Adapter pattern targeted towards the last situation. It specifies the creation of a specialized external interface for an implementation object that is specifically designed to be published and called by distributed clients. The client interface may have exactly the same interface as the implementation object, or it may be simplified or enhanced to optimize its network performance.

In an M3 application, it is necessary to determine which objects are distributed and visible to clients versus which objects are local language objects. The Distribution Adapter pattern allows the designer a means to formalize this distinction. Distributed objects need to have a well-defined interface, be made known to the M3 framework, and be appropriate for distribution. This design pattern addresses the first two of those attributes, but leaves the third up to the designer. The designer must still apply good distributed object design principles and ensure that the object they are distributing is of appropriate weight, function, and visibility.

In a distributed object system, not all objects must be made accessible from network clients. Local language objects are objects like instances of C++ classes that are meant to be used only within the context of a single program address space. The overhead to use them is extremely low. Distributed objects on the other hand carry an inherent overhead in using them due to crossing address space boundaries. In order to perform acceptably, a designer may choose which objects need to be accessible across process address space boundaries and ensure that the cost of invoking operations on these remote objects doesn't consume an inordinate amount of resources. Often a single distributed object will act on the behalf of many local language objects and their interfaces may in fact be quite different. It is up to the designer to carefully choose those objects that must be distributed and design their interfaces for acceptable application performance.

Figure 26:
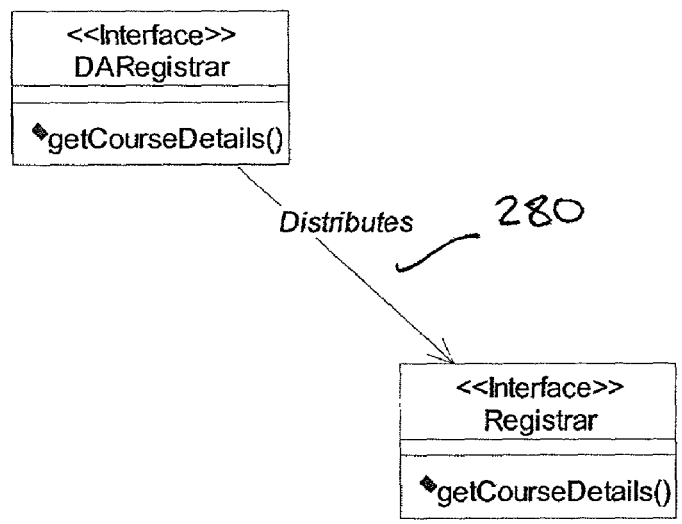

The Expert System menu includes the ability to apply the Distribution Adapter pattern to a specific class in the Logical View. This pattern has the following effect:

1. Creates a new Class for the selected class named DA<class name>.
2. Populates the new Class with copies of all of the operations in the source class to serve as a starting point for the Distribution Adapter interface.
3. Marks the new Class with properties to ensure that it is included in the generated IDL, Java, or C++ implementations.
4. Creates a Distributes association 280 from the new class to the source class as shown in FIG. 26.
5. If the source class is included in a Server, mark the new DA class to be included in that server.

After the application of this pattern, designers are free to further modify the implementation and DA class designs. No attempt will be made to reconcile these designs with each other. Should a designer wish to reconcile the designs, the DA class should be deleted and the DA pattern applied to the source object again. The servant initialization code for the distribution adapter is included in any servers that include the distribution adapter. Skeletons and stubs are produced for the distribution adapter class and methods.

The Distributed Interface Pattern

This pattern is nearly identical to the Distribution Adapter design pattern except that no new classes are created. The classes this pattern is applied to have the appropriate properties set to ensure that the class is included in IDL generation and has a servant class created for it.

The user may already have a good three-tier design defined and may need to just add the necessary details to make it a good M3 design. This pattern allows the designer to mark a class as being distributed. No additional classes need to be created as the model already has the appropriate classes defined, but without the required M3 properties. This pattern sets those properties.

It is important that the class this pattern is applied to be appropriate for distribution or client access. Applying this pattern to an entity class would move the business logic from the server to the client reducing the design for this portion of the application to a two-tier model.

The Session pattern may be applied to a Rose class to create a Session class that will be exposed to M3 clients. A session class allows a client to establish a session with an application that will be used for some series of interactions.

The Session design pattern allows a client application to create an instance of an object that serves as a session with the server. In one embodiment, information is placed in the object ID that identifies the session to both the client and the server. In the M3 University Production example, the registrar nearly acts as an instance of a session. The ID of the student could have been placed in the object ID of the IOR instead of passing it along in each call to the registrar. This would eliminate problems such as using a student ID with a registrar that can't handle that student.

There are times when it may be desirable for a client to maintain a session to a server. Although the client and server must still deal with all the issues associated with server failure and session re-establishment, the benefits of maintaining the session may outweigh the effort of dealing with those issues. An example may be where the server has to do a great deal of database access in order to get the proper objects ready for the client and that the client must make multiple interactions with those objects.

This pattern allows the client to establish a session with a server that maintains state over more than one interaction. As a result, the server must now explicitly manage the state and readiness of the object. In addition, the server may fail between interactions and recovery for this must be included in the client application.

The Expert System menu includes the ability to apply the Session pattern to a class in the Logical View. This pattern has the following effect:
1. Marks the class with properties to ensure that it is included in the generated IDL, and Java or C++ implementations.
2. Sets the appropriate properties to ensure that the activation policy is set to process.

After the application of this pattern, designers are free to further modify the implementation and Session class designs. Typically, one would want to then apply the Factory pattern to the session class to create a factory.

The servant initialization code for the session class is included in any servers that include the session class. Skeletons are produced for the session class and its methods. Code and comments will be generated in the servant implementation and any factory methods for this class that indicate this interface maintains a session with the client and that the server needs to explicitly control the state of instances.

Helper Patterns—The Process Entity Pattern

These patterns help the designer get started on the design of one or more classes. The designer may then alter the generated classes to fit the needs of the specific application.

The Process Entity pattern may be applied to a Rose Entity class to help create a Process class that will be exposed to M3 clients.

The design pattern "Process Entity" is described in the M3 documentation. This pattern is well suited to 3 tier computing environments.

The Process Entity Pattern tries to assist the designer in designing the process objects. The assumption is that the entity objects will already exist, either through other modeling work, or by way of import from a persistent storage facility. As the starting point is one or more entity objects, there is little in the way of semantic knowledge available to the Process Entity Pattern to guide the designer in the creation of the process objects. This means that the pattern can either provide an empty class to the user, which in that case the new class button provided by Rose is sufficient, or the pattern can gather whatever information is available in the entity objects and populate the process object as a starting point. The designer may alter the class created by applying this pattern.

The Process Entity design pattern tries to help the designer focus the design on objects that perform high value operations on behalf of the user. Instead of having the client application directly manipulate entity objects, the process entity model suggests that the process objects operate on the entity objects. This saves the time and resources necessary to move the entity object's state to the client. It also hides or encapsulates the business logic from the client by placing that in the process object's implementation. The operations provided by the process objects should closely map to the business processes the application is providing. The Process Entity design pattern doesn't manipulate the model, but instead acts as a validator and tries to ensure that the process class doesn't violate the spirit of the process entity pattern. Specifically, during validation, the pattern will check to see if any attributes have been defined for the class and if so, flag them with an error.

The Expert System menu includes the ability to apply the Process Entity pattern to one or more process classes in the Logical View. This pattern has the following effect:

It marks the classes as process classes, meaning they will participate in model validation.

After the application of this pattern, designers are expected to further modify the Process class design.

In one embodiment, no code is generated as a result of applying this pattern. During model validation, the class will be checked to ensure that it doesn't have any attributes or other properties that are inconsistent with the process entity pattern.

The Proposal Manager Pattern

The Proposal Manager Pattern may be applied to a Rose class to create a new class that provides methods to access an object's state and propose updates to that state. This new class will be exposed to M3 clients.

This design pattern provides a means to access entity objects from a client in a controlled fashion. A common use for this pattern is to allow a complex stateful object to be obtained by the client from the proposal manager, allow the client to manipulate the state of the object, and then propose the changes in state back to the proposal manager.

There is a class of applications that need to allow a client to access and manipulate the state of a complex object. A loan application would be a good example. The loan application is obtained from the proposal manager, manipulated by the user within the client, and then the updates are proposed back to the proposal manager. The proposal manager is responsible for ensuring that the update is valid.

State management needs to be controlled by the proposal manager. It is conceivable that more than one client may want to access and potentially propose updates to the same object. Explicit locking, especially held over a long period of time, tends to have a severe impact on application performance and scalability. It can also be error prone or adversely affected by faults in the network or application. As a result, it is likely that the proposal manager will not maintain a lock on the objects being managed, but instead evaluate the proposed changes against the current state of the object and determine whether to accept the proposal or not. How this is done is application specific and left up to the implementation of the proposal manager class.

Figure 27:
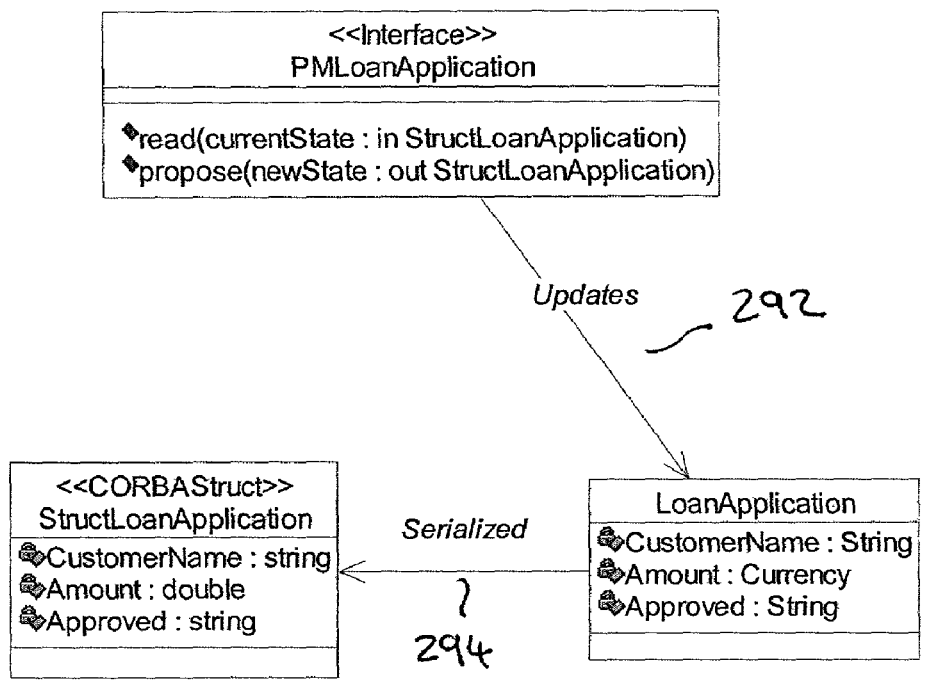

The Expert System menu includes the ability to apply the Proposal Manager pattern to a class in the Logical View. This pattern has the following effect as further shown in FIG. 27.

1. Creates a new class from the selected class named PM<class name>that will be the proposal manager used to access and update the source class.
2. Creates an association named Updates 292 from the proposal manager class to the source class.
3. Creates a new class Struct<class_name>as a CORBA structure that will hold the source class's state.
4. Creates an association named Serialized 294 from the source class to the data structure class.
5. Populates the proposal manager class with the read and propose operations.
6. Marks the proposal manager class and structure class with properties to ensure that they are included in the generated IDL, and Java or C++ implementations.

After the application of this pattern, designers are free to further modify the proposal manager class by adding, removing, or modifying operations.

The servant initialization code for the proposal manager is included in any servers that include the proposal manager. Skeletons are produced for the proposal manager class and skeletal implementations are generated for the read and propose methods.

The Entity Manager Pattern

The Entity Manager Pattern may be applied to a Rose class to create a new class that provides methods to access the object's state by passing the state in structures. This new class will be exposed to M3 clients.

This design pattern provides a means to access entity objects from a client in a controlled fashion. The most typical use for this pattern is in the development of table maintenance or other administrative programs. As the entities are exposed directly to the client, any client application that uses these manager classes will need to be carefully controlled.

In the Entity Manager Design Pattern, an entity object has its state made available to a client by means of operations that allow retrieving and updating the object's attributes via structures.

Many applications store their persistent state in relational databases. Although the provider of the database most likely will have tools to manipulate entries in the database, they may not be distributed or have the same sort of access control that the rest of the application is using. Using the Entity Manager Design Pattern allows access to the underlying entity objects, but still using the M3 infrastructure.

This pattern assumes that all the state associated with an entity class is represented by the attributes for that class. This will be true for classes created by importing database schema information, but not necessarily true in the general case. The designer may ensure this pattern is applied appropriately.

Figure 28:
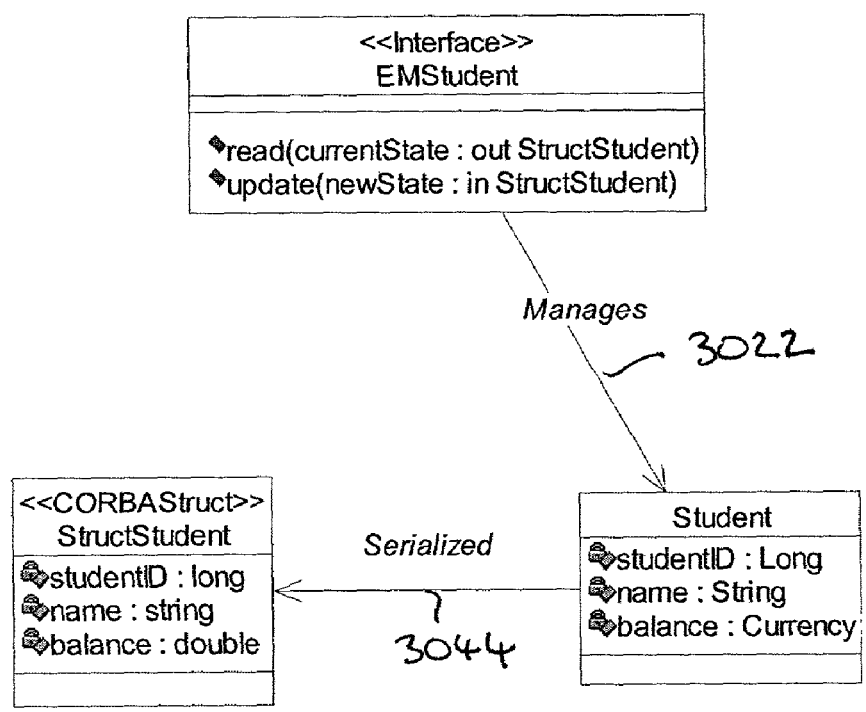

The Expert System menu includes the ability to apply the Entity Manager pattern to an entity class in the Logical View as shown in FIG. 28. This pattern has the following effect:

1. Creates a new CORBA structure for the selected class named Struct<class name>that will be the structure used to pass the entity class's state between the client and server.
2. Populates the data structure class with all the attributes from the entity class.
3. Creates an association named Serialized 304 from the entity class to the data structure class.
4. Creates another new class for the selected class named EM<class name>that will act as the entity manager for the entity class.
5. Populates the entity manager class with the read and update operations that pass the data structure class as parameters.
6. Creates an association named Manages 302 from the entity manager class to the entity class.
7. Marks the entity manager class and structure class with properties to ensure that they are included in the generated IDL, and Java or C++ implementations.

After the application of this pattern, designers are free to further modify the data structure class by adding, removing, or modifying members and to modify the entity manager class by adding, removing, or modifying operations. The servant initialization code for the entity manager is included in any servers that include the entity manager. Skeletons are produced for the entity manager class and implementations are generated for the read and update methods. If the entity classes were created using the Data Entity Pattern, this pattern will be able to completely generate the implementations of read and update methods.

The Data Entity Pattern

The Data Entity Pattern may be applied to one of the RDBMS classes (such as a relational table, relational view, or composite view class) to create a Data Entity class. The Data Entity class will perform all data access operations and represent a "business entity" within the application.

The Data Entity pattern is a specialization of the Adapter pattern that provides a common set of interfaces for RDBMS data access.

The persistent state of entity objects is often maintained in a relational database. This pattern helps the designer create entity objects that perform a relational to object mapping. This pattern works with the Data Entity Generation facility of the Expert System to provide language objects that map to relational tables and views. This pattern while not specific to M3, is helpful to the typical designer that has state information in existing relational tables that will make up some or all of the state of the application's entity objects. In general, the classes created by this pattern may not be made distributable or directly accessible to client applications.

The Expert System menu includes the ability to apply the Data Entity pattern to a specific RDBMS class in the Logical View. This pattern has the following effect:

1. Creates a new package in the corresponding M3 data entity group.
2. Populates the new package with a class diagram to depict the pattern implementation for the data entity class.
3. Creates a class to represent the relational entity.
4. Creates an access class to represent the interface for the entity.

In one embodiment, after the application of this pattern, no attempt is made to reconcile these designs with each other. Changes may be made to the source model and the pattern can be reapplied to the modified entity.

Design Model Verification

Design model verification is the process by which a Rose application model is scanned for correctness and completeness prior to the generation of implementation code. A software designer can invoke model verification through the Expert System add-in menu. Model verification is also invoked internally by the Expert System prior to the generation of source code. While scanning the Rose model, model verification can uncover several kinds of errors and inconsistencies:

Incomplete model
Missing or incorrect stereotypes and properties
Missing defaults and application settings
Design Pattern inconsistencies After scanning the Rose model, model verification makes a determination as to whether or not to the model is complete, consistent, and may be implemented. In addition, model verification can also uncover certain design constructs that may result in poor performance in an M3 environment. These performance concerns are also noted and reported to a software designer, although they will not be used to determine if the model is complete and consistent.

Model Verification Reporting

Fatal errors encountered during the model verification process are reported immediately and the verification process is terminated. The offending portion of the Rose model is highlighted and a message is displayed to the software designer providing details of the error encountered. Non fatal model verification results are reported in the Rose Log Window. Results are categorized into one of several severity levels:

Informational messages, which contain information concerning the execution of the verification
Warning messages, which include verification results which may highlight an inconsistency or omission, but do not necessarily preclude the generation of an implementation for a model
Error messages, which highlight problems with the model that preclude the generation of source code
Performance messages, which highlight design constructs that may result in less than optimal performance in an M3 environment.

In one embodiment, The Expert System may present its model verification results using a specialized user interface dialog window instead of the Rose Log Window. This user interface dialog permits software designers to select an error or warning and go to the model construct that caused the verification result.

Source Code Generation

In one embodiment, the Expert System places the source files and project files for an M3 server in a Windows directory. The selection of the directory can be affected by defaults, The Expert System add-in menu dialogs, and by Rose component property settings. The Expert System "Application Settings" dialog can be used to specify a root directory for the Application development tree. By default, the application-wide source files will be placed in this directory, and the files that are specific to a server will be placed in server-specific subdirectories that are created as children of the root directory.

The Expert System users can override these defaults to place specific source file in any desired directory by providing values to the "Directory" property of the corresponding Component elements. Directory specifications may either be absolute or relative to the application root directory.

C++

The C++ server code that The Expert System generates is intended to be utilized by an integrated development environment (IDE) such as Developer Studio™. There are no constraints placed on the generated code that it depend on any Microsoft™ specific include or library files. The following actions will occur as part of code generation.

Generate IDL
Generate client and server implementation files
Build commands will be generated for Developer Studio™ Visual C++ and other IDE's.
Server configuration will be in the form of an ICF file.

Client Implementation

In one embodiment, a simple client console application is generated with the project. This client will contain code that will create a bootstrap and find one of the server's factories and instantiate it.

Server Implementation

This code module implements three services: initialize, release and create_servant. Initialize will create a factory reference and register it with the factory finder. Release will unregister the factory. Create_servant will create and return an implementation.

Server Factory Implementation

This code module defines a factory class for each class identified as a factory in the Rose model. Each factory will support at least one function called create_object from the COS life cycle extension simple factory, in additional to any other factory functions defined in the model.

Servant Implementation

This code module contains the implementation for each interface exported to the implementation repository. A C++ class is created for each interface and a method defined for each operation in the interface. If pseudo code has been defined in Rose for a particular function, it will be included in the method stub as a comment. Each class is defined in a separate file, which has the same name as the class.

Configuration (ICF file)

This file contains a list of C++ classes included in the project and the activation and transaction policies for the factories and servers.

Project File

If the target environment is Windows based, then this is a project file (DSP) that can be used to load the generated code into the IDE. If it is not, then the project file generated is in the form of a makefile, which can be built on the target platform.

Java

The Java server code that The Expert System generates is intended to operate within the Java server environment that is being created as part of the IcedJava project. The artifacts necessary to support Java server development closely align with the artifacts that are necessary to support C++ server development.

Configuration (XML file)

This file contains a list of java files that will be inserted into a Java archive for this project. It also contains activation and transaction policies for the factories and servers.

Model Mappings

The following sections describe the mapping between ROSE model constructions and the contents of the generated source files.

IDL Generation

The Interface Definition Language (IDL) file describes the external CORBA interface into an M3 application. Application designers have complete flexibility to partition their CORBA interface definitions into separate IDL files in separate directories.

Modules

Applications often group externally visible interfaces into Modules. These modules generally correspond to a natural partitioning of the application. The partitioning of interfaces into modules helps to segment a large, complicated application into smaller, more easily understood collections of behavior. Application designers create Modules using Logical View Packages. A Package becomes a CORBA Module by setting the "CORBAModule" stereotype. CORBA elements under the package are then included within the scope of that module. Modules may be nested within other modules.

Interfaces

To specify that a Class should be included as an interface definition within the generated IDL, set the class stereotype to "Interface". Although CORBA permits one to define an Interface outside of the scope of a module, in The Expert System Interfaces must have a CORBA Module stereotype package somewhere in their parentage. All of the attributes, relationships, and operations that are associated with this Class specification will be included in the generated IDL as interface attributes and operations.

Data Type Definitions

To specify that a Class should be included as a type definition within the generated IDL, the class stereotype is set to CORBATypedef.

Constants

To specify that a Class should be included as a constant definition within the generated IDL, set the class stereo type to CORBAConstant, the class property Implementation Type to the type of the constant, and the class property ConstValue to the value of the constant.

Structures

To specify that a Class should be included as a structure definition within the generated IDL, set the class stereotype to CORBAStruct. Both Attributes and Roles will be included in the structure. Each has an "Order" property that may be used to establish a relative positioning of the elements within a structure.

Unions

To specify that a Class should be included as a union definition within the generated IDL, set the class stereotype to CORBAUnion. The attributes and relationships of the class define the union elements, as is the case for CORBAStruct classes.

Enumerations

To specify that a Class should be included as an enumerated value within the generated IDL, set the class stereotype to CORBAEnum. The Attributes of the class define the possible enum values. The Order property may be used to explicitly set a relative positioning of possible enum values.

C++ Code Generation

The C++ code generation model mapping is adopted from the Rational Rose 98 IDL generation facility.

Java Code Generation

The Java code generation model mapping is adopted from the Rational Rose 98 IDL generation facility.

M3 Server Projects

Servers are executable processes that provide implementations for a set of interfaces for an M3 application. These Servers generally correspond to a natural partitioning of an application, often from the perspective of optimizing transaction throughput, distribution load balancing and other network configuration considerations. An application Rose model may specify one or more M3 servers are to be built as part of an M3 application. Like the grouping of interfaces into CORBA Modules, the grouping of interface implementations into Servers is specified in Rose by using Components. Designers specify the creation of an M3 server by setting the component's stereotype to "M3 Server". Interfaces are then selected for inclusion within a server by dragging classes from one of the Logical Views in the Browser window to the desired Server Component.

The partitioning of interface implementations within a Server and the grouping of interfaces into CORBA Modules may or may not align on the same boundaries. The same Rose Component objects may be used to specify both constructions.

The foregoing description has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for software application development and modeling, capable of being integrated with a software application design modeling tool, comprising:
   an expert system for automatically
      reading an initial software application design UML model conforming to the software application design model tool,
      reading a one or plurality of target application server design patterns, wherein each of the design patterns identifies a common object oriented design structure for designing an application in a particular context,
      enhancing the software application design UML model to conform to the target application server design patterns, including creating logical packages for each data entity group in the application if one does not already exist, allowing a developer to review the enhanced software application design UML model, and then repeating the steps of reading the UML model and server design patterns, and enhancing the UML model, so as to refine the software application design UML model, and generating code implementations for the target application server defined by the enhanced software application design UML model; and, an interface to a software application design modeling tool for modeling said software application design UML model, wherein said modeling includes said reading of software application design UML model, said enhancing of software application design UML model, and said generating code implementations.

2. The system of claim 1 wherein said expert system further includes means for specifying application design requirements.

3. The system of claim 1 wherein said expert system further includes means for generation of an application test client to verify the integrity of the generated and modified code.

4. The system of claim 1 wherein said expert system is provided as a plugin to the software application design modeling tool.

5. The system of claim 1 further comprising:
a database interface to allow retrieval of application design data from a relational database; and,
an interface repository for storing interface definition language files.

6. The system of claim 1 further comprising:
means for reverse engineering an interface definition language file to extract application design information.

7. The system according to claim 1 wherein said expert system further comprises means for generation of support files for the generated and modified code.

8. The system of claim 1 wherein said expert system is provided as a add-in to the software application design modeling tool.

9. The system according to claim 1 wherein said expert system further comprises means for scanning said software application design UML model for correctness and completeness prior to generation of implementation code.

10. A method for software application development and modeling, capable of being integrated with a software application design modeling tool, comprising the steps of:
providing an expert system for automatically
reading an initial software application design UML model conforming to the software application design model tool,
enhancing the software application design UML model to conform to target application server design patterns, wherein each of the design patterns identifies a common object oriented design structure for designing an application in a particular context, and wherein enhancing includes creating logical packages for each data entity group in the application if one does not already exist,
allowing a developer to review the enhanced software application design UML model, and then repeating the steps of reading and enhancing the UML model, so as to refine the software application design UML model, and generating code implementations for the target application server defined by the enhanced software application design UML model; and, providing an interface to a software application design modeling tool for modeling said software application design UML model, wherein said modeling includes said reading of software application design UML model, said enhancing of software application design UML model, and said generating code implementations.

11. The method according to claim 10 wherein said expert system further includes means for specifying application design requirements.

12. The method according to claim 10 wherein said expert system further includes means for generation of an application test client to verify the integrity of the generated and modified code.

13. The method according to claim 10 wherein said expert system is provided as a plugin to the software application design modeling tool.

14. The method according to claim 10 further comprising:
providing a database interface to allow retrieval of application design data from a relational database; and,
providing an interface repository for storing interface definition language files.

15. The method according to claim 10 further comprising:
providing means for reverse engineering an interface definition language file to extract application design information.

16. The method according to claim 10 wherein said expert system further comprises means for generation of support files for the generated and modified code.

17. The method according to claim 10 wherein said expert system is provided as a add-in to the software application design modeling tool.

18. The method according to claim 1 wherein said expert system further comprises means for scanning said software application design model for correctness and completeness prior to generation of implementation code.

19. An expert system for software application development and modeling, comprising:
means for reading an initial software application design model conforming to the software application design model tool;
means for automatically enhancing the software application design model to conform to target application server design patterns, wherein each of the design patterns identifies a common object oriented design structure for designing an application in a particular context, and wherein enhancing includes creating logical packages for each data entity group in the application if one does not already exist;
means for allowing a developer to review the enhanced software application design UML model, and then repeating the steps of reading and enhancing the UML model, so as to refine the software application design UML model; and
means for automatically generating code implementations for the target application server defined by the enhanced software application design model.

20. A method for enabling software application development and modeling, capable of being integrated with a software application design modeling tool, comprising the steps of:

reading an initial software application design UML model conforming to the software application design model tool;

reading a one or plurality of target application server design patterns, wherein each of the design patterns identifies a common object oriented design structure for designing an application in a particular context;

enhancing the software application design UML model to conform to the target application server design patterns, including creating logical packages for each data entity group if one does not already exist;

allowing a developer to review the enhanced software application design UML model, and then repeating the steps of reading the UML model and server design patterns, and enhancing the UML model, so as to refine the software application design UML model; and generating code implementations for the target application server defined by the enhanced software application design UML model.

21. A computer readable medium, including instructions stored thereon, which when executed cause the computer to perform the steps of:

reading an initial software application design UML model conforming to the software application design model tool;

reading a one or plurality of target application server design patterns, wherein each of the design patterns identifies a common object oriented design structure for designing an application in a particular context;

enhancing the software application design UML model to conform to the target application server design patterns, including creating logical packages for each data entity group if one does not already exist;

allowing a developer to review the enhanced software application design UML model, and then repeating the steps of reading the UML model and server design patterns, and enhancing the UML model, so as to refine the software application design UML model; and generating code implementations for the target application server defined by the enhanced software application design UML model.

* * * * *